(12) United States Patent
Inagaki et al.

(10) Patent No.: US 7,929,604 B2
(45) Date of Patent: Apr. 19, 2011

(54) DATA PROCESSING DEVICE AND DATA PROCESSING METHOD

(75) Inventors: Hiroki Inagaki, Katano (JP); Hideki Fukuda, Nara (JP); Satoshi Kondo, Yawata (JP)

(73) Assignee: Panasonic Corporation, Osaka (JP)

( * ) Notice: Subject to any disclaimer, the term of this patent is extended or adjusted under 35 U.S.C. 154(b) by 1640 days.

(21) Appl. No.: 10/515,555

(22) PCT Filed: Aug. 1, 2003

(86) PCT No.: PCT/JP03/09843
§ 371 (c)(1),
(2), (4) Date: Nov. 23, 2004

(87) PCT Pub. No.: WO2004/014085
PCT Pub. Date: Feb. 12, 2004

(65) Prior Publication Data
US 2005/0226326 A1    Oct. 13, 2005

(30) Foreign Application Priority Data

Aug. 5, 2002  (JP) ................................ 2002-227108

(51) Int. Cl.
*H04N 7/12*       (2006.01)
(52) U.S. Cl. ................................. 375/240.12
(58) Field of Classification Search .............. 375/240.12
See application file for complete search history.

(56) References Cited

U.S. PATENT DOCUMENTS

| | | |
|---|---|---|
| 5,666,461 A | 9/1997 | Igarashi et al. |
| 5,894,526 A | 4/1999 | Watanabe et al. |

(Continued)

FOREIGN PATENT DOCUMENTS

JP    2000-102017    4/2000

(Continued)

OTHER PUBLICATIONS

International Search Report for corresponding PCT/JP2003/009843, mailed Nov. 18, 2003.
European Search Report for corresponding European Application No. 03766717.7 mailed Aug. 31, 2010.
Guillotel et al., "Adapative Encoders: The New Generation of MPEG-2 Encoders", SMPTE Journal, SMPTE Inc., Scarsdale, NY, vol. 109, No. 4, Apr. 1, 2000, pp. 287-294, XP000927092.

(Continued)

*Primary Examiner* — Y. Lee
*Assistant Examiner* — Richard Torrente
(74) *Attorney, Agent, or Firm* — Renner, Otto, Boisselle & Sklar, LLP

(57) ABSTRACT

A data processor is provided to compression-code moving picture data without decreasing coding efficiency even if the moving picture includes a picture with particularly violent motion. The moving picture is obtained by presenting a plurality of frame pictures, each consisting of two field pictures, one after another. The processor (100) includes a memory (101) for storing the moving picture data, a calculating section (108) for calculating a parameter, representing how much the moving picture has changed, based on the moving picture data of the two field pictures, a determining section (109) for determining, by the parameter calculated, on what picture unit the moving picture data is going to be compression-coded by the intra-picture coding method and the forward predictive coding method and adopting a picture structure defining the predetermined picture unit, and a processing section (102-107, 110) for compression-coding the moving picture data, stored in the memory, according to the picture structure adopted, thereby generating compressed data.

6 Claims, 14 Drawing Sheets

U.S. PATENT DOCUMENTS

| | | | |
|---|---|---|---|
| 6,052,417 A * | 4/2000 | Fujiwara et al. | 375/240.12 |
| 6,160,849 A * | 12/2000 | Igarashi et al. | 375/240.14 |
| 6,611,558 B1 * | 8/2003 | Yokoyama | 375/240.15 |
| 6,950,465 B1 | 9/2005 | Yokoyama et al. | |
| 2001/0055337 A1 | 12/2001 | Matsuzaki et al. | |
| 2002/0136301 A1 * | 9/2002 | Yoneyama et al. | 375/240.13 |

FOREIGN PATENT DOCUMENTS

| | | |
|---|---|---|
| JP | 2000-333179 A | 11/2000 |
| JP | 2002-16924 | 1/2002 |

OTHER PUBLICATIONS

Yoneyama et al., "One-pass VBR MPEG encoder using scene adaptive dynamic GOP structure", International Conference on Consumer Electronics, 2001 Digest of Technical Papers, ICCE. Los Angeles, CA Jun. 19-21, 2001, pp. 174-175, XP010552119.

Yutaka Yokoyama, "Adaptive GOP Structure Selection for Real-Time MPEG-2 Video Encoding", Image Processing 2000, Proceedings, 2000 International Conference on Sep. 10-13, 2000, IEEE, Piscataway, NJ, pp. 832-835, vol. 2, XP031534583.

* cited by examiner

FIG.3  CONVENTIONAL ART
(a) M=1
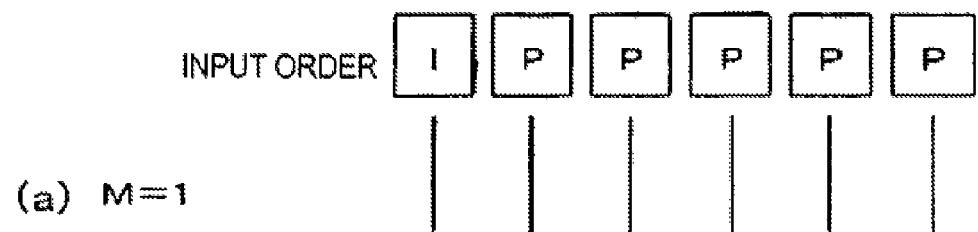
(b) M=2
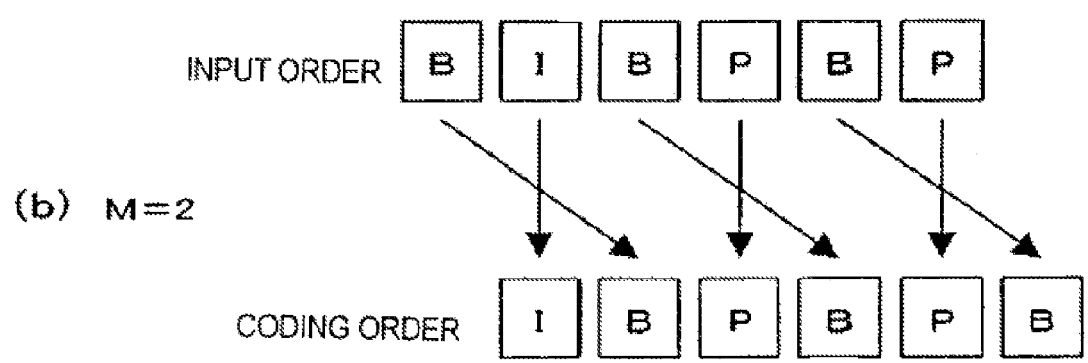
(c) M=3
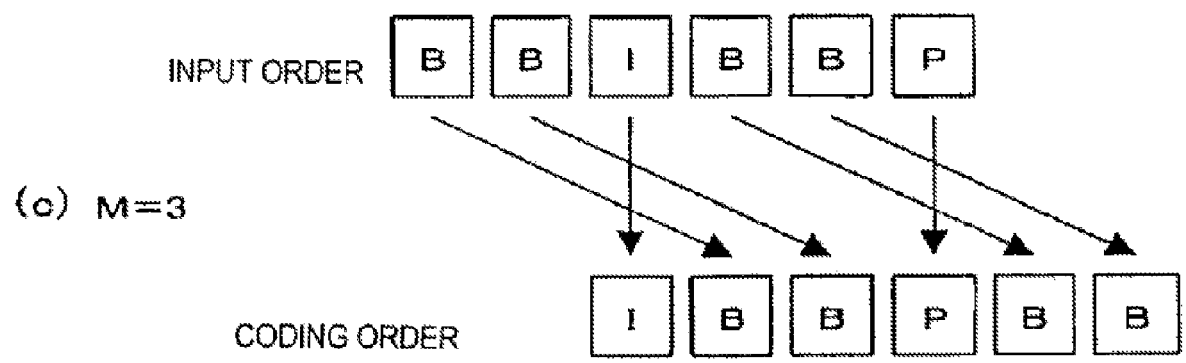

FIG.4  CONVENTIONAL ART
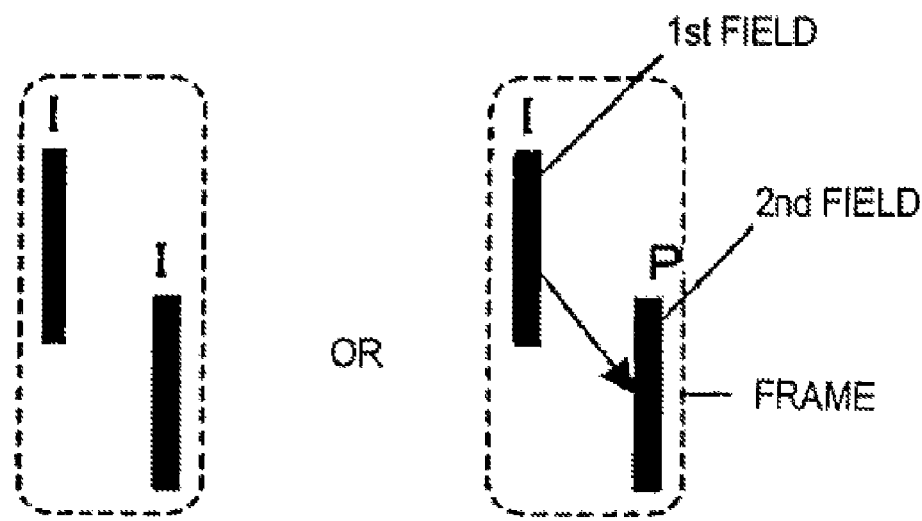
(a)
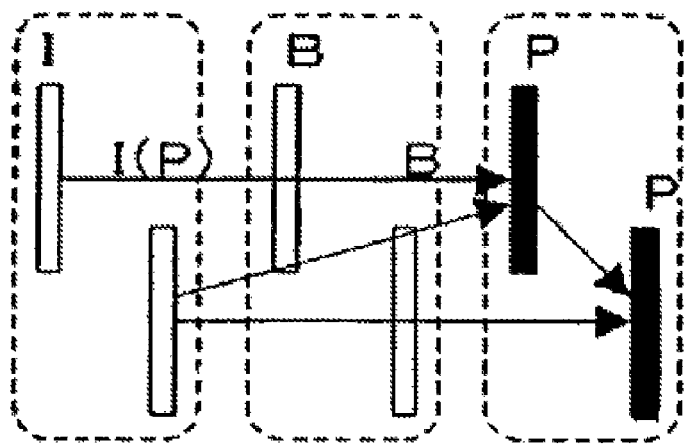
(b)
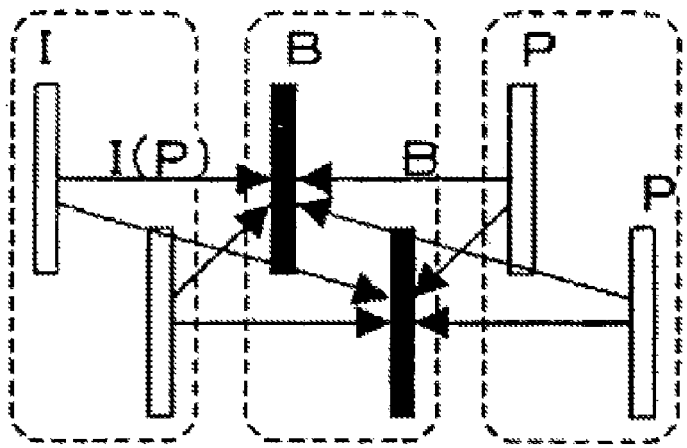
(c)

FIG.12
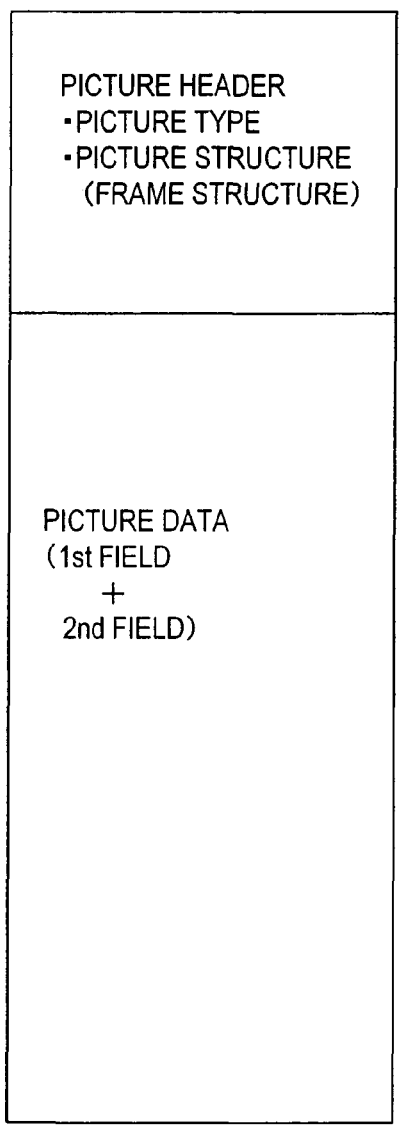
(a) DATA STRUCTURE WHEN COMPRESSION-CODED BY FRAME STRUCTURE
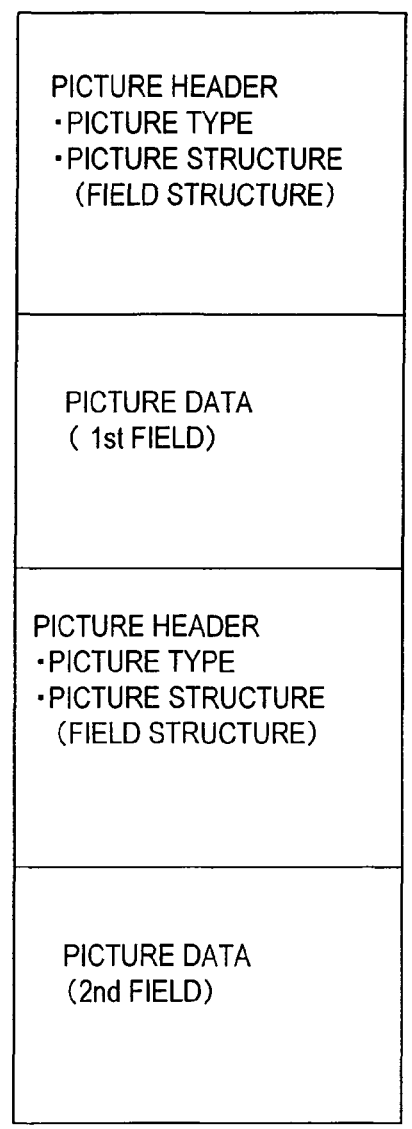
(b) DATA STRUCTURE WHEN COMPRESSION-CODED BY FIELD STRUCTURE FIG.15
(a)
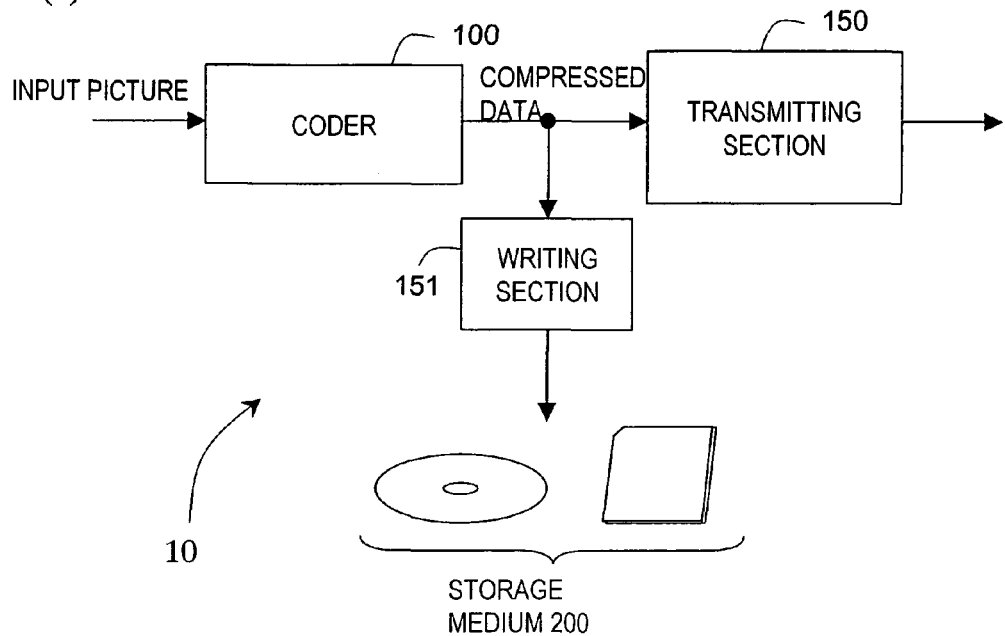
(b)
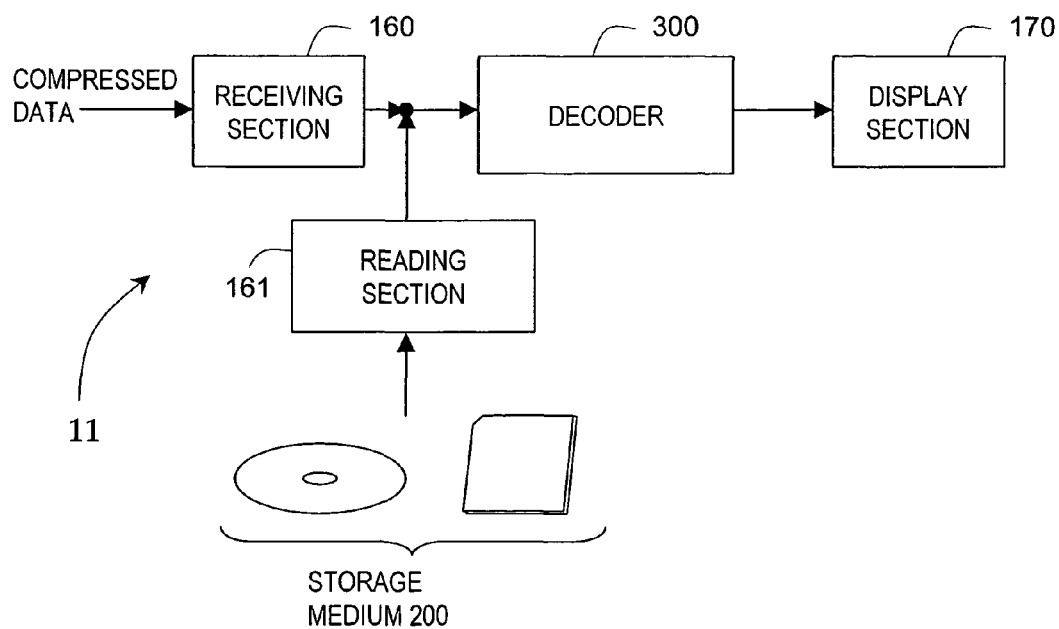

DATA PROCESSING DEVICE AND DATA PROCESSING METHOD

TECHNICAL FIELD

The present invention relates to a moving picture coding technology for compressing moving picture data with high efficiency.

BACKGROUND ART

MPEG-1, MPEG-2 and so on are known as standards for coding moving picture data with high efficiency. In the MPEG-1 and MPEG-2, moving picture data is coded by an intra-picture coding method, a forward predictive coding method or a bidirectional predictive coding method appropriately selected.

When coded by such a moving picture coding technique, a moving picture is often a mixture of pictures that have been compression and coded (compression-coded) by the intra-picture coding method (which will be referred to herein as "I-pictures"), pictures that have been compression-coded by the forward predictive coding method (which will be referred to herein as "P-pictures") and pictures that have been compression-coded by the bidirectional predictive coding method (which will be referred to herein as "B-pictures"). An I-picture is coded using only the data in the picture itself and without doing any temporal prediction. A P-picture is predictively coded by reference to an I- or P-picture, which is located before the P-picture. And a B-picture is predictively coded by reference to I- and P-pictures, which are located before and after the B-picture. The pictures to be referred to are called "reference pictures". The reference pictures for use in prediction are determined according to the type of the given picture.

FIG. 1 shows a moving picture data prediction scheme using bidirectional prediction. In FIG. 1, I, P and B denote an I-picture, P-pictures and B-pictures, respectively. In the prediction scheme shown in FIG. 1, the order of coding is I1, P4, B2, B3, P7, B5 and B6. In FIG. 1, the picture I1 is intra-picture coded. The picture P4 is forward predictive coded by reference to the picture I1. Each of the pictures B2 and B3 is bidirectionally predictive coded by reference to the pictures I1 and P4. The picture P7 is forward predictive coded by reference to the picture P4. Each of the pictures B5 and B6 is bidirectionally predictive coded by reference to the pictures P4 and P7.

The I-, P- and B-pictures are usually arranged periodically. FIG. 2 shows an arrangement of I-pictures, P-pictures and B-pictures. In general, I-pictures are arranged every N frames, P-pictures are arranged every M frames between two I-pictures, and (M-1) B-pictures are provided between the I-picture and the following P-picture and between that P-picture and the following P-picture. FIGS. 3(a), 3(b) and 3(c) show correspondence between the order in which respective types of pictures of the moving picture data are input and the order in which those pictures are coded in three situations where M=1, M=2 and M=3, respectively.

As shown in FIG. 3(a), if M=1, then the moving picture consists of only I- and P-pictures and includes no B-pictures. Accordingly, the respective pictures in the incoming moving picture are coded without changing the order at all, thus causing no processing delay during the coding process. However, if M=2, then one B-picture is present between the I-picture (or a P-picture) and the next P-picture as shown in FIG. 3(b). In that case, a processing delay of one frame is caused before each B-picture starts being coded. The reason is as follows. Specifically, no B-picture is allowed to start being coded until its reference pictures (i.e., I- and P-pictures), located before and after the B-picture, have been coded. Accordingly, the B-picture must be coded in a different order from that of the incoming pictures.

If M=3, then two B-pictures are present between the I-picture (or a P-picture) and the next P-picture as shown in FIG. 3(c). In that case, for the same reason as that described for FIG. 3(b), a delay of two frames is caused before each B-picture starts being coded.

The B-pictures are used because the efficiency of prediction can be increased by adopting the bidirectional prediction technique as a combination of the forward and backward predictions. Also, unlike the I- or P-picture, no B-picture will be used as a reference picture in subsequent predictive coding. Thus, the error caused during the predictive coding process never propagates. Accordingly, even if the B-picture is coded at a lower amount of data than the I- or P-picture, the deterioration in image quality should be much less visible. However, when B-pictures are used, the reference picture interval M for the P-pictures to be forward predicted increases due to the insertion of the B-pictures. Accordingly, the prediction tends to be particularly inaccurate for a moving picture with swift motion, among other things.

In view of these considerations, the coding efficiency can be improved by dynamically switching the reference picture interval M for forward prediction in accordance with the property of the given moving picture data.

Conventional techniques of coding with the reference picture interval M for forward prediction switched dynamically are disclosed in Japanese Laid-Open Publication No. 9-294266, Japanese Laid-Open Publication No. 10-304374, and Japanese Laid-Open Publication No. 2001-128179, for example.

Japanese Laid-Open Publication No. 9-294266 describes a technique of scaling motion vector of a coded frame and controlling the reference picture interval M such that its magnitude falls within the motion search range of the frame to be coded next.

Japanese Laid-Open Publication No. 10-304374 describes a technique of estimating the inter-frame prediction efficiency by using a prediction error or activity obtained from a coded block and controlling the reference picture interval M according to this prediction efficiency.

Japanese Laid-Open Publication No. 2001-128179 describes a technique of estimating the inter-frame predictability by using the coding rates or complexity of coding of the respective types of pictures and controlling the reference picture interval M according to this predictability.

In an interlaced moving picture in which one frame picture is composed of two field pictures, the reference pictures can be switched and the coding efficiency can be increased not just by switching the reference picture intervals M but also by changing the picture structures. The picture structure is a coding unit. Thus, either a frame structure or a field structure may be selected for each picture to be coded. Specifically, if the frame structure is selected as the picture structure, the coding is carried out on a frame-by-frame basis. On the other hand, if the field structure is selected, then the coding is carried out based on first and second field pictures that make up one frame.

In the following description, a field picture to be intra-picture coded will be referred to herein as an "I-field", a field picture to be forward predictive coded will be referred to herein as a "P-field", and a field picture to be bidirectionally predictive coded will be referred to herein as a "B-field". Also, by looking at the type of the first field picture, a frame of which the first field is an I-field will be referred to herein as an "I-frame", a frame of which the first field is a P-field will be referred to herein as a "P-frame", and a frame of which the first field is a B-field will be referred to herein as a "B-frame".

FIGS. 4(a), 4(b) and 4(c) shows relationships between picture types and reference pictures according to the field structure. Specifically, FIG. 4(a) shows I-frames, FIG. 4(b) shows a P-frame, and FIG. 4(c) shows a B-frame. In the I-frame shown in FIG. 4(a), either a type of which the first and second field pictures are both I-fields or a type of which the first and second field pictures are an I-field and a P-field, respectively, is selected. If the second field picture is a P-field, then the first field picture of the same frame is used as the reference picture. In the P-frame shown in FIG. 4(b), the first field picture thereof uses the previously coded I- or P-field as the reference picture of the predictive coding. On the other hand, the second field picture may use the first field picture of the same frame (i.e., the previous field picture) as the reference picture. As a result, the reference picture interval for the second field picture is just one field, thus increasing the prediction efficiency significantly for a picture with a fast motion, in particular. In the B-frame shown in FIG. 4(c), each of the first and second field pictures uses the I- and P-field of the previous and succeeding frames as the reference pictures of the predictive coding.

Recently, a technique of realizing compression coding of good quality more efficiently even if the moving picture has a particularly fast motion is in high demand. To achieve this object, however, the motion velocity of a moving picture needs to be judged as high or low and the coding control needs to be improved so as to maintain a good quality and reduce the data size, both of which have been satisfied only insufficiently by the prior art so far.

An object of the present invention is to estimate the motion velocity of a moving picture more accurately in compression-coding moving picture data and to realize highly efficient compression coding of good quality by dynamically switching the coding methods and coding units even if a picture with a fast motion is included.

DISCLOSURE OF INVENTION

A data processor according to the present invention compression-codes moving picture data, representing a moving picture, on the basis of a predetermined picture unit by an intra-picture coding method, a forward predictive coding method or a bidirectional predictive coding method. The moving picture is obtained by presenting a plurality of frame pictures, each consisting of two field pictures, one after another. The data processor includes: a memory for storing the moving picture data; a calculating section for calculating a parameter, representing how much the moving picture has changed, based on the moving picture data of the two field pictures; a determining section for determining, by the parameter that has been calculated by the calculating section, on what picture unit the moving picture data is going to be compression-coded by the intra-picture coding method and the forward predictive coding method and adopting a picture structure defining the predetermined picture unit; and a processing section for compression-coding the moving picture data, stored in the memory, according to the picture structure that has been adopted by the determining section, thereby generating compressed data.

In one preferred embodiment, the calculating section obtains a temporal variation from a variation in the moving picture data between the two field pictures and a spatial variation from a variation in the moving picture data within each of the two field pictures, and calculates the parameter based on the temporal and spatial variations.

In another preferred embodiment, the two field pictures are a first field picture corresponding to odd-numbered lines of the frame picture and a second field picture corresponding to even-numbered lines of the frame picture. The calculating section specifies two lines of the first and second field pictures, which are adjacent to each other within the frame picture, and obtains a difference between the moving picture data of the two lines, thereby calculating the temporal variation. The calculating section also specifies two adjacent lines within each of the first and second field pictures, and obtains a difference between the moving picture data of the two lines, thereby calculating the spatial variation.

In another preferred embodiment, the calculating section divides each said frame picture into multiple blocks, calculates the temporal and spatial variations based on the moving picture data of each of the blocks, and calculates, as the parameter, a ratio of the number of blocks, of which the variation in the moving picture is at least equal to a predetermined degree, to the overall number of blocks based on the temporal and spatial variations of the respective blocks.

In another preferred embodiment, if the parameter is greater than a predetermined threshold value, the determining section adopts a field structure as the picture structure, and the processing section compression-codes the moving picture data on a field picture basis.

In another preferred embodiment, the determining section increases the number of field pictures to be compression-coded by the intra-picture coding method and/or the number of field pictures to be compression-coded by the forward predictive coding method.

In another preferred embodiment, the determining section compression-codes the field pictures either by the intra-picture coding method only or by the forward predictive coding method only.

In another preferred embodiment, if the parameter that has been calculated by the calculating section has become smaller than the predetermined threshold value, then the determining section adopts a frame structure as the picture structure, and the processing section compression-codes the moving picture data on a frame picture basis.

In another preferred embodiment, if a first picture to be compression-coded by the forward predictive coding method and a second picture to be predictive coded by reference to the first picture are contiguous with each other, then the determining section adopts a field structure as the picture structure of the second picture. But if the first and second pictures are not contiguous with each other, then the determining section adopts the frame structure as the picture structure of the second picture.

In another preferred embodiment, if a first picture to be compression-coded by the forward predictive coding method and a second picture to be predictive coded by reference to the first picture are contiguous with each other, then the determining section adopts either a frame structure or a field structure as the picture structure of the second picture. But if the first and second pictures are not contiguous with each other, then the determining section adopts the frame structure as the picture structure of the second picture.

In another preferred embodiment, the determining section determines the picture structure of pictures to be compression-coded by the forward predictive coding method according to a period that is defined by either a plurality of pictures to be compression-coded by the intra-picture coding method or a plurality of pictures to be compression-coded by the forward predictive coding method.

In another preferred embodiment, the determining section determines the picture structure of the pictures to be compression-coded by the forward predictive coding method according to the period that is defined by the pictures to be compression-coded by the intra-picture coding method.

In another preferred embodiment, the determining section determines the picture structure of the pictures to be compression-coded by the forward predictive coding method according to the period that is defined by the pictures to be compression-coded by the forward predictive coding method.

In another preferred embodiment, if a first picture to be compression-coded by the intra-picture coding method and a second picture to be compression-coded by the forward predictive coding method by reference to the first picture are contiguous with each other, then the determining section adopts a field structure as the picture structure of the first picture and determines that the first and second field pictures of the first picture be compression-coded by the intra-picture coding method and the forward predictive coding method, respectively.

In another preferred embodiment, the determining section determines that the picture structure of a picture to be compression-coded by the intra-picture coding method be the same as that of the previous picture that has just been compression-coded by either the intra-picture coding method or the forward predictive coding method.

In another preferred embodiment, the determining section determines that the picture structure of a picture to be compression-coded by the intra-picture coding method be the same as that of the next picture to be compression-coded by either the intra-picture coding method or the forward predictive coding method.

In another preferred embodiment, the determining section determines that the picture structure of a first picture to be compression-coded by the bidirectional predictive coding method be the same as that of a reference picture to be referred to by the first picture.

A data processing system according to the present invention includes the data processor described above and a transmitting section for transmitting the compressed data, which has been generated by the processing section of the data processor, through a transport medium.

Another data processing system according to the present invention includes the data processor described above, and a writing section for writing the compressed data, which has been generated by the processing section of the data processor, onto a storage medium.

Another data processor according to the present invention compression-codes moving picture data, representing a moving picture, on the basis of a predetermined picture unit by an intra-picture coding method, a forward predictive coding method or a bidirectional predictive coding method. The moving picture is obtained by presenting a plurality of frame pictures one after another. The data processor includes: a memory for storing the moving picture data; a calculating section for calculating a temporal variation representing a variation in the moving picture data between two contiguous frame pictures and a spatial variation representing a variation in the moving picture data within each of the two frame pictures, and also calculating a parameter, representing how much the moving picture has changed, based on the temporal and spatial variations; a determining section for determining, by the parameter that has been calculated by the calculating section, what compression coding method should be adopted for each of the frame pictures; and a processing section for compression-coding the moving picture data, stored in the memory, by the method that has been adopted by the determining section, thereby generating compressed data.

In one preferred embodiment, the moving picture is obtained by presenting one after another a plurality of frame pictures, each consisting of two field pictures. The two field pictures are a first field picture corresponding to odd-numbered lines of the frame picture and a second field picture corresponding to even-numbered lines of the frame picture. The calculating section specifies two lines of the first and second field pictures, which are adjacent to each other within the frame picture, and obtains a difference between the picture data of the two lines, thereby calculating the temporal variation. The calculating section also specifies two adjacent lines within each of the first and second field pictures, and obtains a difference between the picture data of the two lines, thereby calculating the spatial variation.

In another preferred embodiment, the calculating section specifies two lines, which are located at the same position within the two frame pictures, and obtains a difference between the picture data of the two lines, thereby calculating the temporal variation. The calculating section also specifies two adjacent lines within one of the two frame pictures, and obtains a difference between the picture data of the two lines, thereby calculating the spatial variation.

In another preferred embodiment, the determining section increases the number of frame pictures to be compression-coded by the intra-picture coding method and/or the number of frame pictures to be compression-coded by the forward predictive coding method.

In another preferred embodiment, the determining section compression-codes the frame pictures either by the intra-picture coding method only or by the forward predictive coding method only.

Another data processing system according to the present invention includes the data processor described above, and a transmitting section for transmitting the compressed data, which has been generated by the processing section of the data processor, through a transport medium.

Yet another data processing system according to the present invention includes the data processor described above, and a writing section for writing the compressed data, which has been generated by the processing section of the data processor, onto a storage medium.

A data processing method according to the present invention is a method for compression-coding moving picture data, representing a moving picture, on the basis of a predetermined picture unit by an intra-picture coding method, a forward predictive coding method or a bidirectional predictive coding method. The moving picture is obtained by presenting a plurality of frame pictures, each consisting of two field pictures, one after another. The method includes the steps of: storing the moving picture data; calculating a parameter, representing how much the moving picture has changed, based on the moving picture data of the two field pictures; determining, by the parameter calculated, on what picture unit the moving picture data is going to be compression-coded by the intra-picture coding method and the forward predictive coding method and adopting a picture structure defining the predetermined picture unit; and compression-coding the moving picture data according to the picture structure adopted, thereby generating compressed data.

Another data processing method according to the present invention is a method for compression-coding moving picture data, representing a moving picture, on the basis of a predetermined picture unit by an intra-picture coding method, a forward predictive coding method or a bidirectional predictive coding method. The moving picture is obtained by presenting a plurality of frame pictures one after another. The method includes the steps of: storing the moving picture data; calculating a temporal variation representing a variation in the moving picture data between two contiguous frame pictures and a spatial variation representing a variation in the moving picture data within each of the two frame pictures; calculating a parameter, representing how much the moving picture has changed, based on the temporal and spatial variations; determining, by the parameter calculated, what compression coding method should be adopted for each of the frame pictures; and compression-coding the stored moving picture data by the adopted method, thereby generating compressed data.

BRIEF DESCRIPTION OF DRAWINGS

FIGS. 3(a), 3(b) and 3(c) show correspondence between the order in which respective types of pictures of the moving picture data are input and the order in which those pictures are coded in three situations where M=1, M=2 and M=3, respectively.

FIGS. 4(a), 4(b) and 4(c) respectively show what frames an I-frame, a P-frame and a B-frame refer to.

FIG. 12(a) shows the data structure of compression-coded picture data as a frame structure, and FIG. 12(b) shows the data structure of compression-coded frame picture data as a field structure.

FIG. 15(a) shows the arrangement of functional blocks for an encoding system 10, and FIG. 15(b) shows the arrangement of functional blocks for a decoding system 11.

BEST MODE FOR CARRYING OUT THE INVENTION

Hereinafter, preferred embodiments of the present invention will be described with reference to the accompanying drawings.

Figure 5:
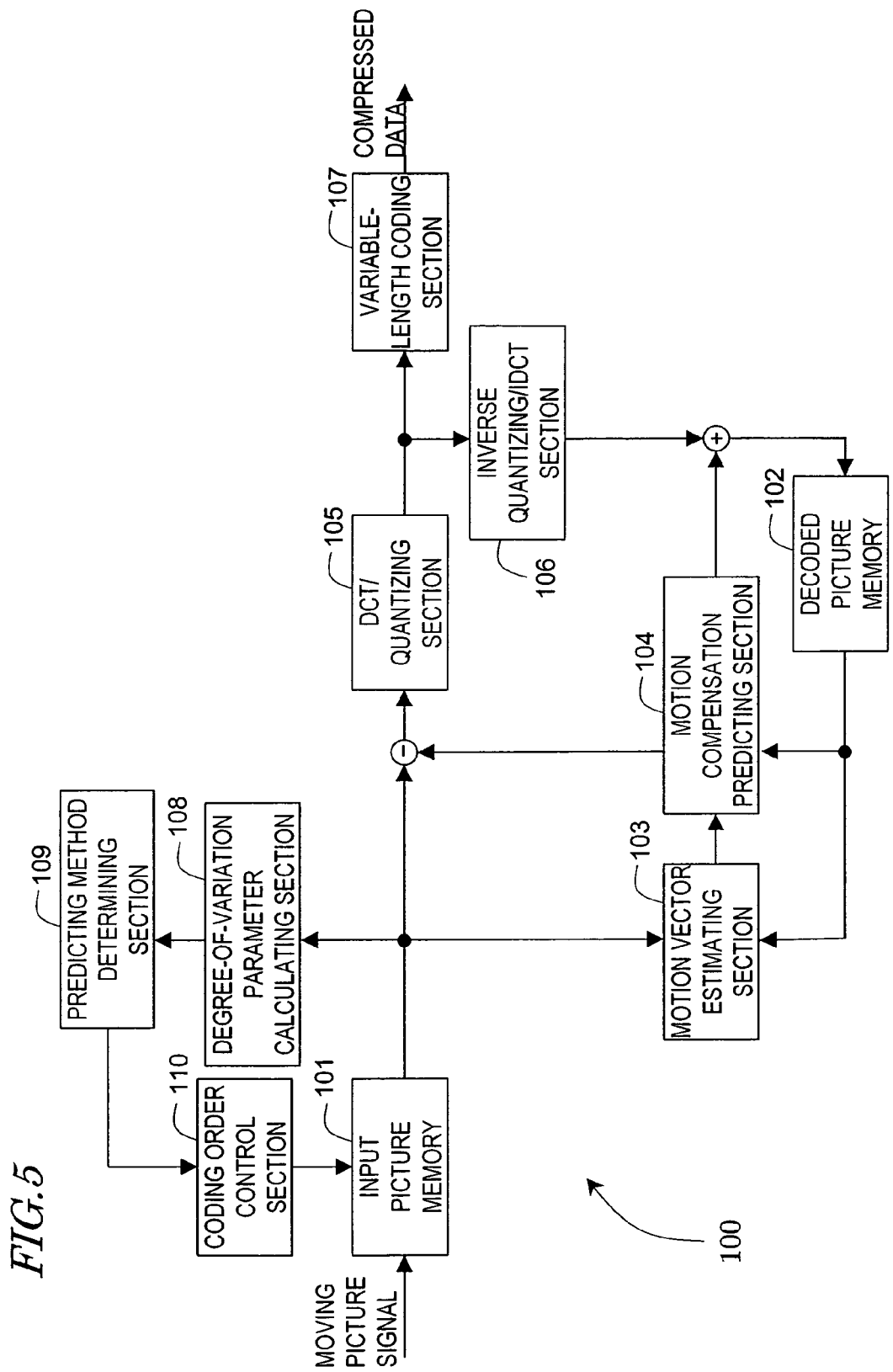
FIG. 5 shows an arrangement of functional blocks for a moving picture coder 100 according to a preferred embodiment.

FIG. 5 shows an arrangement of functional blocks for a moving picture coder 100 according to a preferred embodiment. The moving picture coder 100 compression-codes moving picture data, obtained from a moving picture signal such as a TV signal, in compliance with the MPEG-2 standard, for example, thereby outputting compressed data. The moving picture data represents a moving picture and includes data about respective frame pictures. Optionally, the moving picture data may also include sound-related audio data. By presenting a series of frame pictures and sound continuously, the moving picture becomes a viewable and audible object.

Hereinafter, a configuration for the moving picture coder 100 will be described. The moving picture coder 100 includes an input picture memory 101, a decoded picture memory 102, a motion vector estimating section 103, a motion compensating predicting section 104, a DCT/quantizing section 105, an inverse quantizing/IDCT section 106, a variable-length coding section 107, a degree-of-variation parameter calculating section 108, a predicting method determining section 109 and a coding order control section 110.

The input picture memory 101 stores the input moving picture signal as moving picture data until the moving picture signal is coded. The moving picture data is stored in the memory 101 in such a format as to identify a series of pictures one by one. Also, the memory 101 can store the picture data in a sufficiently large number to cope with the processing delay of each picture due to the coding order. Accordingly, even if the coding order of the moving picture data is different from the order in which the moving picture data has been input while the moving picture coder 100 is compression-coding the moving picture data, the processing can be continued. For example, as for the arrangement of picture types shown in FIG. 3(c), the input picture memory 101 can store picture data corresponding to at least four frame pictures. The moving picture data is coded in the coding order to be specified by the coding order control section 110 as will be described later.

The decoded picture memory 102 stores decoded picture data, which is obtained by adding together the picture data decoded by the inverse quantizing/IDCT section 106 and the motion compensated predicted picture data obtained by the motion compensating predicting section 104. The decoded picture data will be used as reference picture data by the motion vector estimating section 103 and motion compensating predicting section 104.

By reference to the picture data stored in the decoded picture memory 102, the motion vector estimating section 103 estimates the magnitude of motion (or variation) of the picture data in the input picture memory 101 as a motion vector.

The motion compensating predicting section 104 generates motion compensated predicted picture data by using the motion vector that has been estimated by the motion vector estimating section 103 and the decoded picture data stored in the decoded picture memory 102.

The DCT/quantizing section 105 performs a discrete cosine transform (DCT) on the predicted error data and quantizes the error data with a specified quantization value. The predicted error data corresponds to the difference between the picture data in the input picture memory 101 and the motion compensated predicted picture data generated by the motion compensating predicting section 104. Optionally, the DCT/quantizing section 105 may process the input picture data itself without using the motion compensated predicted picture data.

In processing the pictures as I- and P-pictures, the inverse quantizing/IDCT section 106 performs inverse quantization and inverse discrete cosine transform (IDCT) on the encoded data obtained by the DCT/quantizing section 105, thereby generating decoded pictures to be used as reference pictures.

The variable-length coding section 107 performs variable-length coding on the data that has been subjected to the DCT and quantization by the DCT/quantizing section 105 and on motion location information about the motion vector that has been estimated by the motion vector estimating section 103, thereby outputting compressed data.

The degree-of-variation parameter calculating section 108 calculates a degree-of-variation parameter using a temporal variation and a spatial variation, obtained from picture feature quantities, with respect to the picture data of the pictures stored in the input picture memory 101. In this case, the "picture feature quantities" refer to pixel data (e.g., brightness data) values at respective coordinates of a picture and are elements that make up the picture data. The degree-of-variation parameter represents the degree of variation in contents (i.e., violence or quickness) between the respective pictures of a moving picture to be presented. More specific processing to be done by the degree-of-variation parameter calculating section 108 will be described in detail later.

A predicting method determining section 109 determines the reference pictures and the picture structure of the picture to be encoded according to the degree-of-variation parameter that has been calculated by the degree-of-variation parameter calculating section 108.

In accordance with the predicting method that has been determined by the predicting method determining section 109, a coding order control section 110 controls the coding order of the picture data that is stored in the input picture memory 101.

One of the principal features of the moving picture coder 100 of the present invention lies in the processing to be carried out by the degree-of-variation parameter calculating section 108 and the predicting method calculating section 109. Thus, the processing to be done by these components will be described particularly in detail while the operation of the moving picture coder 100 is described. It should be noted that the other components, identified by the reference numerals 102 through 107 and 110, will be referred to as a "processing section" collectively unless any of them needs to be explained specifically.

In the following description, the moving picture is supposed to be an interlaced picture. Thus, one frame picture is composed herein of two field pictures.

Figure 6:
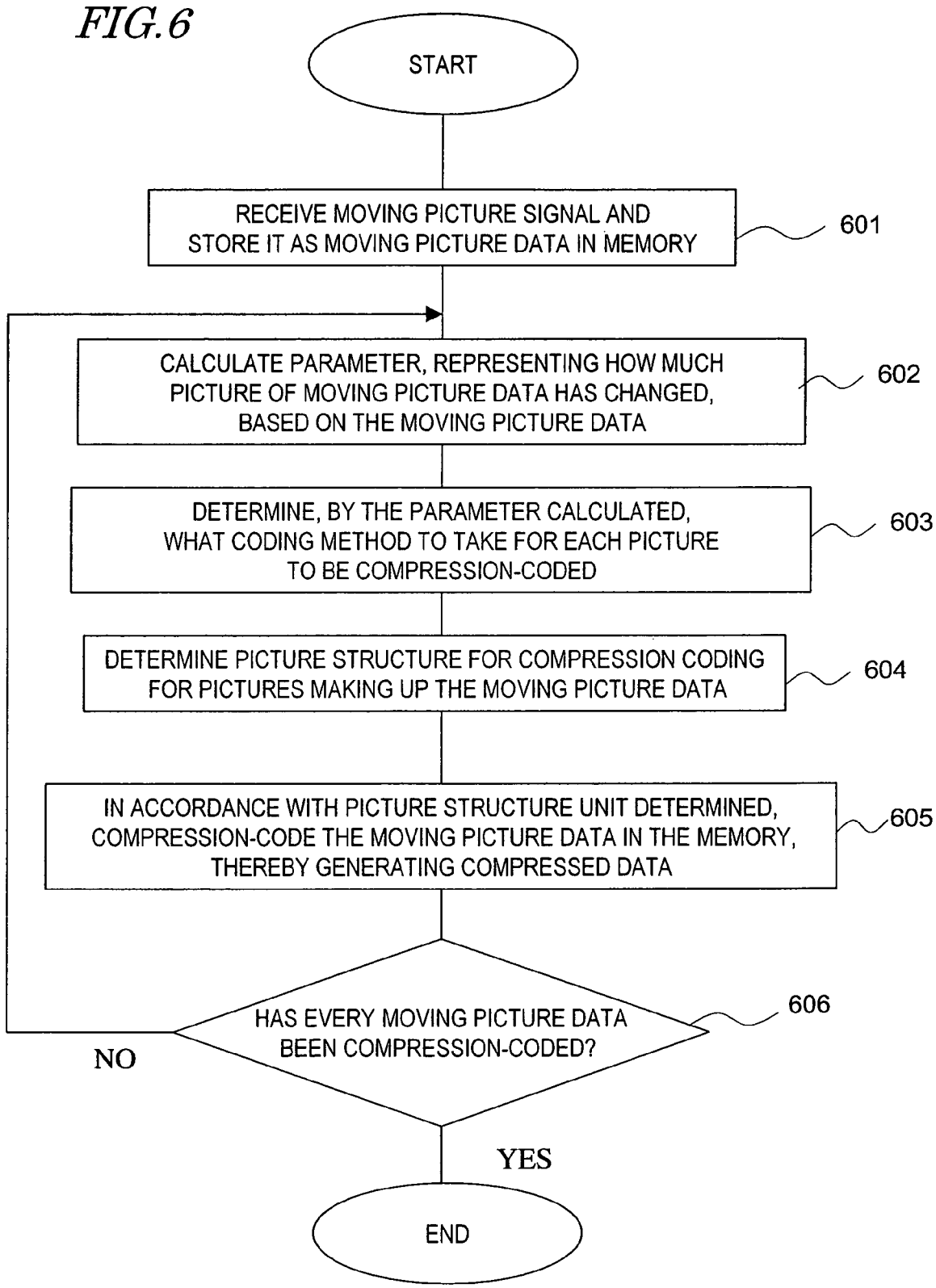
FIG. 6 is a flowchart showing the flow of a process to be carried out by the moving picture coder 100.

FIG. 6 shows the flow of the process to be carried out by the moving picture coder 100. First, in Step 601, the moving picture coder 100 receives a moving picture signal and stores it as moving picture data in the input image memory 101. Next, in Step 602, the degree-of-variation parameter calculating section 108 calculates a degree-of-variation parameter based on the moving picture data of multiple pictures. Specifically, first, the degree-of-variation parameter calculating section 108 obtains a temporal variation from the variation between the picture data representing the first and second field pictures that make up one frame picture. Next, the degree-of-variation parameter calculating section 108 further calculates a spatial variation based on the variation of the picture data in the picture for each of the first and second field pictures. Thereafter, the degree-of-variation parameter calculating section 108 calculates the degree-of-variation parameter based on the temporal and spatial variations thus obtained. This process step will be described in further detail with reference to the accompanying drawings.

It should be noted that in this preferred embodiment, the frame picture for which the temporal and spatial variations are calculated is supposed to be a candidate picture to be compression-coded as an I-picture or a P-picture. The candidate pictures are selected preliminarily according to the predetermined rule for the moving picture coder 100. For example, among the frame pictures included in the input moving picture data, candidate pictures to be I-pictures are selected every N frames and candidate pictures to be P-pictures are selected every M frames between two I-pictures. It will be determined afterward through a series of processing to be done by the moving picture coder 100 which of I-, P- and B-pictures each frame picture will be in the end.

Figure 7:
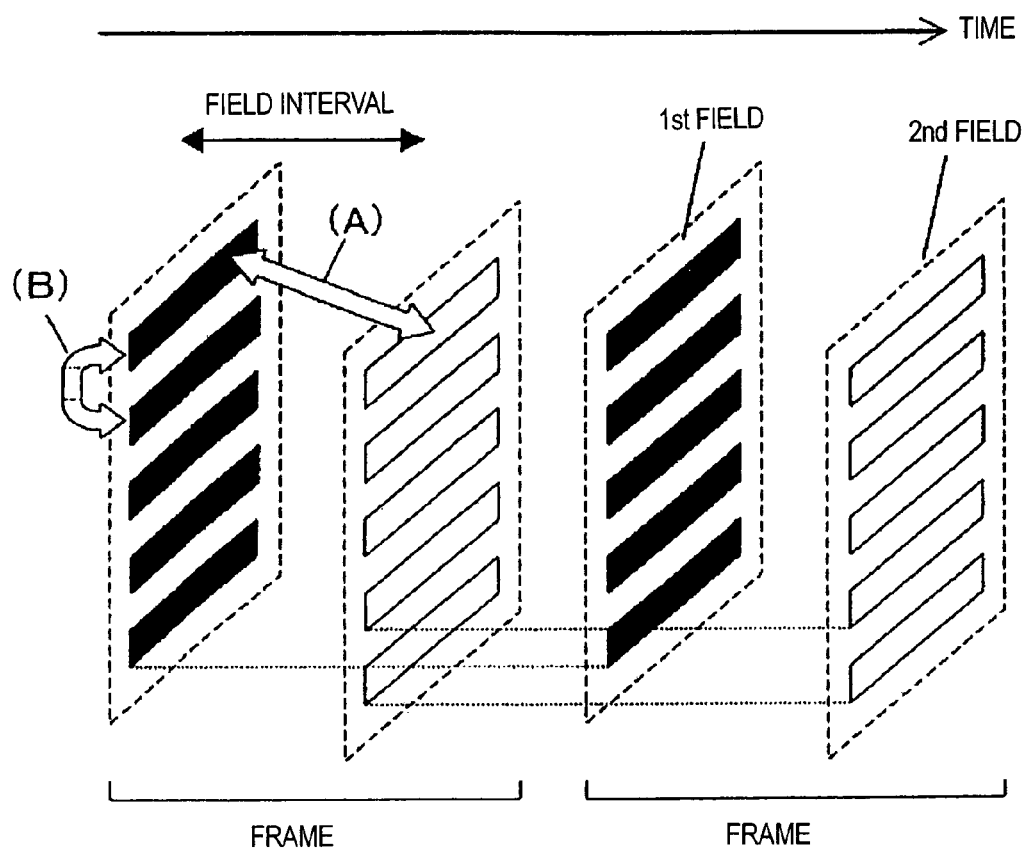
FIG. 7 shows the concepts of temporal variation (A) and spatial variation (B).

FIG. 7 shows the concepts of temporal variation (A) and spatial variation (B). First of all, one frame picture is composed of two field pictures. For convenience sake, the first field picture is supposed to be a picture representing the odd-numbered lines (i.e., the black lines shown in FIG. 7) of one frame picture, while the second field picture is supposed to be a picture representing the even-numbered lines (i.e., the white lines shown in FIG. 7) of that frame picture.

The temporal variation Dt(A) can be obtained as an average value of the sum of the differences (A) between the pixel data of two vertically adjacent pixels in one frame picture. The "two adjacent pixels" consist of a pixel belonging to the first field picture and its associated pixel belonging to the second field. On the other hand, the spatial variation Ds(B) can be obtained as an average value of the sum of the differences (B) between the pixel data of two vertically adjacent pixels within the first field or the second field.

The degree-of-variation parameter calculating section 108 calculates the temporal variation Dt and spatial variation Ds by the following Equations (1) and (2), respectively:

$$Dt = \sum_{x,y} |F(x, y) - F(x, y+1)|/Nt \qquad \text{(Equation 1)}$$

$$Ds = \sum_{x,y} |F(x, y) - F(x, y+2)|/Ns \qquad \text{(Equation 2)}$$

where F(x, y) represents a pixel value (e.g., a brightness value) at the coordinates (x, y) on the screen and Nt and Ns represent the number of difference data counts to be added together in Equation (1) and the number of difference data counts to be added together in Equation (2), respectively. If a moving picture has little motion (i.e., variation), then the temporal variation Dt is smaller than the spatial variation Ds. This means that frame correlation is stronger than field correlation. Meanwhile, as the motion of a moving picture goes faster, the temporal variation Dt increases and the field correlation becomes stronger and stronger than the frame correlation. In this case, the value of the degree-of-variation parameter Cf of the given picture is calculated by the following Equation (3) using the temporal and spatial variations Dt and Ds obtained by Equations (1) and (2), respectively:

Cf=1 (if Dt=0 and Ds=0)

Cf=(A·Dt+Ds)/(Dt+A·Ds)(otherwise)         (Equation 3)

where A is a constant to adjust the possible value range of the degree-of-variation parameter Cf and is supposed to be a number greater than 1.

As can be seen from Equation (3), the greater the temporal variation Dt, the greater the value of the degree-of-variation parameter Cf. Stated otherwise, the greater the degree-of-variation parameter Cf, the faster the motion of a moving picture is. In particular, by calculating the degree-of-variation parameter Cf based on the picture data of two field pictures that make up one frame picture, even a moving picture with an extremely fast motion can be processed satisfactorily.

Also, when the motion velocity of a moving picture is judged only by the temporal variation, the motion might be judged as fast even if the object within the moving picture shifted by just one pixel. However, by judging the motion velocity by the spatial variation as well as the temporal variation, the influence of a small pixel shift can be reduced. As a result, the motion velocity of the moving picture can be judged more accurately.

In Equations (1) and (2), the temporal and spatial variations Dt and Ds are obtained by averaging the sum of the absolute values of the differences. Alternatively, these variations may also be obtained by averaging the sum of the squares of the differences as in the following Equations (4) and (5):

$$Dt = \sum_{x,y} \{F(x, y) - F(x, y+1)\}^2 / Nt \quad \text{(Equation 4)}$$

$$Ds = \sum_{x,y} \{F(x, y) - F(x, y+2)\}^2 / Ns \quad \text{(Equation 5)}$$

where the respective terms represent the same quantities as the counterparts of Equations (1) and (2). As another alternative, the temporal and spatial variations Dt and Ds may also be obtained by other formulae using differential quantities.

It has been described with reference to FIG. 7 how to calculate the value of the degree-of-variation parameter Cf by obtaining the temporal and spatial variations based on the pixel data of either the entire frame picture or the entire field picture. However, the degree-of-variation parameter Cf may also be obtained by a different method. Hereinafter, that alternative method will be described.

Figure 8:
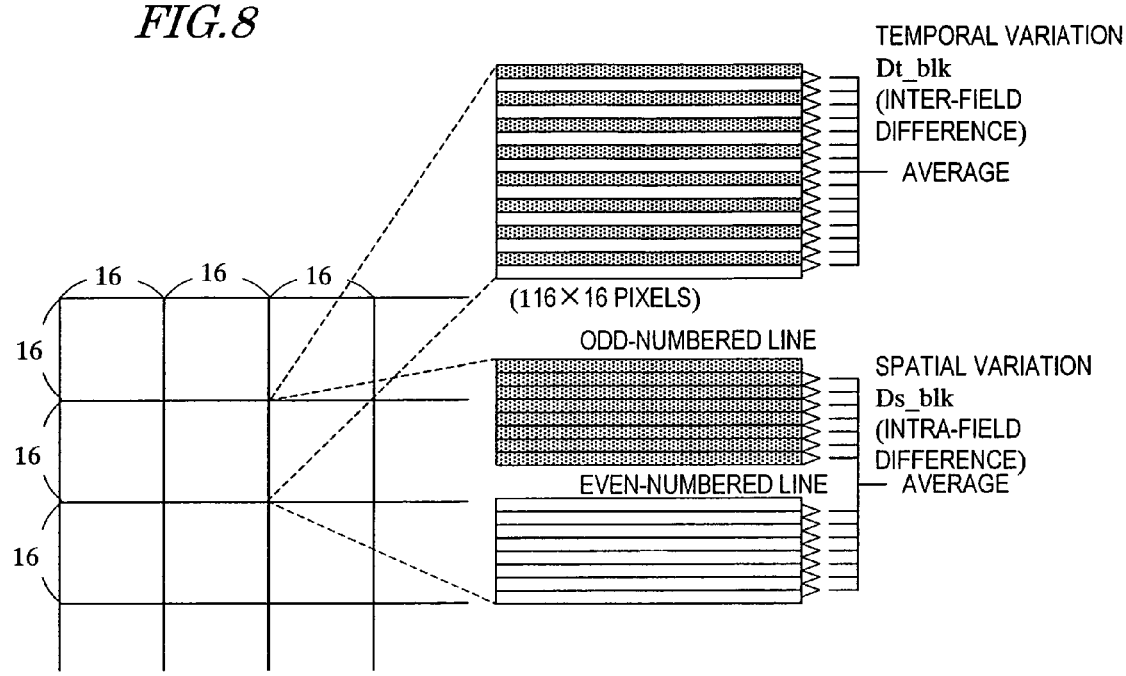
FIG. 8 shows an example in which one frame picture is divided into a plurality of blocks.

FIG. 8 shows an example in which one frame picture is divided into a plurality of blocks. The degree-of-variation parameter calculating section 108 divides one frame picture into a plurality of blocks (each consisting of 16×16 pixels, for example) and calculates a temporal variation Dt_blk and a spatial variation Ds_blk on a block-by-block basis by the following Equation (6) and (7), respectively. The temporal variation Dt_blk can be calculated by averaging the sum of the differences between the picture data of two vertically adjacent pixels within one block. On the other hand, the spatial variation Ds_blk can be calculated by averaging the sum of the differences (B) between vertically adjacent pixels in a field representing the odd-numbered lines of each block and a field representing the even-numbered lines thereof.

$$Dt\_blk = \sum_{x,y} |F(x, y) - F(x, y+1)| / Nt\_blk \quad \text{(Equation 6)}$$

$$Ds\_blk = \sum_{x,y} |F(x, y) - F(x, y+2)| / Ns\_blk \quad \text{(Equation 7)}$$

where F(x, y) represents pixel data at the coordinates (x, y) within a block and Nt_blk and Ns_blk represent the number of difference data counts to be added together in Equation (6) and the number of difference data counts to be added together in Equation (7), respectively.

Based on the temporal variation Dt_blk and spatial variation Ds_blk thus obtained, the degree-of-variation parameter calculating section 108 determines, by the following inequalities (8), whether or not each block has a high degree of field correlation:

$$Dt\_blk > K1 \cdot Ds\_blk \text{ and } Dt\_blk > K2 \quad \text{(Inequalities 8)}$$

where K1 and K2 are constants. If the inequalities (8) are satisfied, the given block is considered as a block having a high degree of field correlation, which means that the moving picture has a fast motion (i.e., variation).

The degree-of-variation parameter calculating section 108 counts the number of blocks that have been judged as having a high degree of field correlation and holds it as High_blks. Then, the degree-of-variation parameter calculating section 108 obtains the ratio of the number of blocks counted High_blks to that of all blocks All_blks subjected to the decision by the following Equation (9) and uses that ratio as the degree-of-variation parameter Cf of the frame picture:

$$Cf = \frac{High\_blks}{All\_blks} \quad \text{(Equation 9)}$$

In Equations (6) and (7), the block-by-block temporal and spatial variations Dt_blk and Ds_blk are obtained by averaging the sum of the absolute values of the differences. Alternatively, these variations may also be obtained by averaging the sum of the squares of the differences as in the following Equations (10) and (11):

$$Dt\_blk = \sum_{x,y} \{F(x, y) - F(x, y+1)\}^2 / Nt\_blk \quad \text{(Equation 10)}$$

$$Ds\_blk = \sum_{x,y} \{F(x, y) - F(x, y+2)\}^2 / Ns\_blk \quad \text{(Equation 11)}$$

where the respective terms represent the same quantities as the counterparts of Equations (6) and (7). As another alternative, the block-by-block temporal and spatial variations Dt_blk and Ds_blk may also be obtained by other formulae using differential quantities. For example, in an MPEG-2 coding process, the estimates for determining the DCT modes (i.e., a frame DCT and a field DCT) of a macroblock (consisting of multiple 16×16 pixel blocks) may be used as the temporal variation Dt_blk and spatial variation Ds_blk, respectively.

In Equation (9), the ratio of the number of blocks that have been judged as having a high degree of field correlation to the overall number of blocks is used as the degree-of-variation parameter Cf. Alternatively, the number of such blocks judged as having a high degree of field correlation (i.e., the High_blks value itself) may be used as the degree-of-variation parameter Cf.

In any of the methods described above, the degree-of-variation parameter calculating section 108 calculates the degree-of-variation parameter Cf based on the picture data of two field pictures that make up one frame picture.

Figure 1:
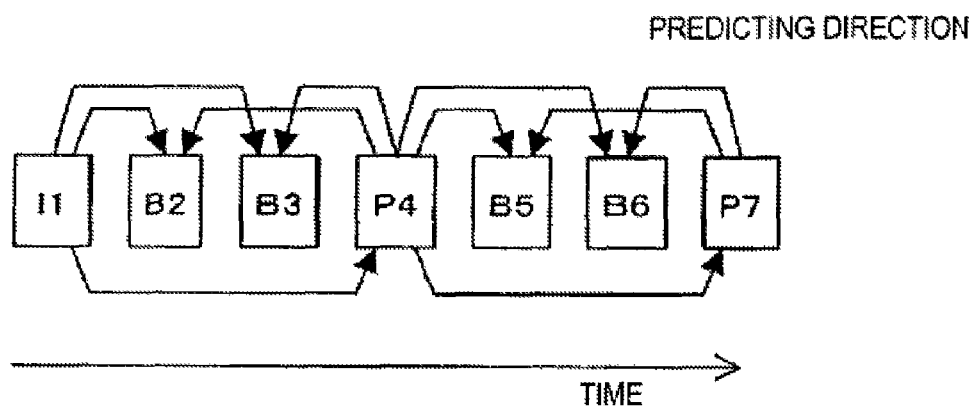
FIG. 1 shows a moving picture data prediction scheme by bidirectional prediction.
Figure 2:
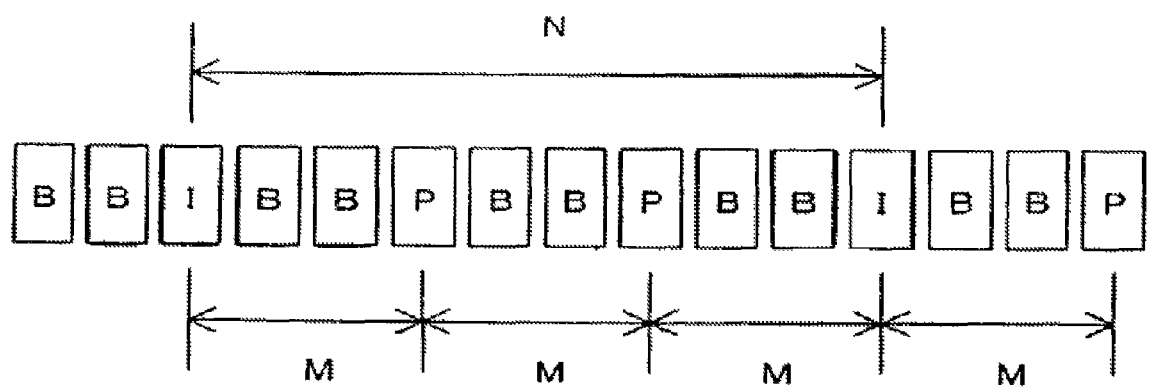
FIG. 2 shows the arrangement of I-pictures, P-pictures and B-pictures.

Next, in Step 603 shown in FIG. 6, the predicting method determining section 109 determines, by the degree-of-variation parameter calculated, what coding method to take for each frame picture to be compression-coded. As a result of this process step, it is determined into which of I-, P- and B-pictures each frame picture should be compression-coded in the end, and at the same time, the M value shown in FIG. 2 is determined, too. Subsequently, in Step 604, the predicting method determining section 109 determines the structure of the picture to be compression-coded for each of the pictures that make up the moving picture data.

Figure 9:
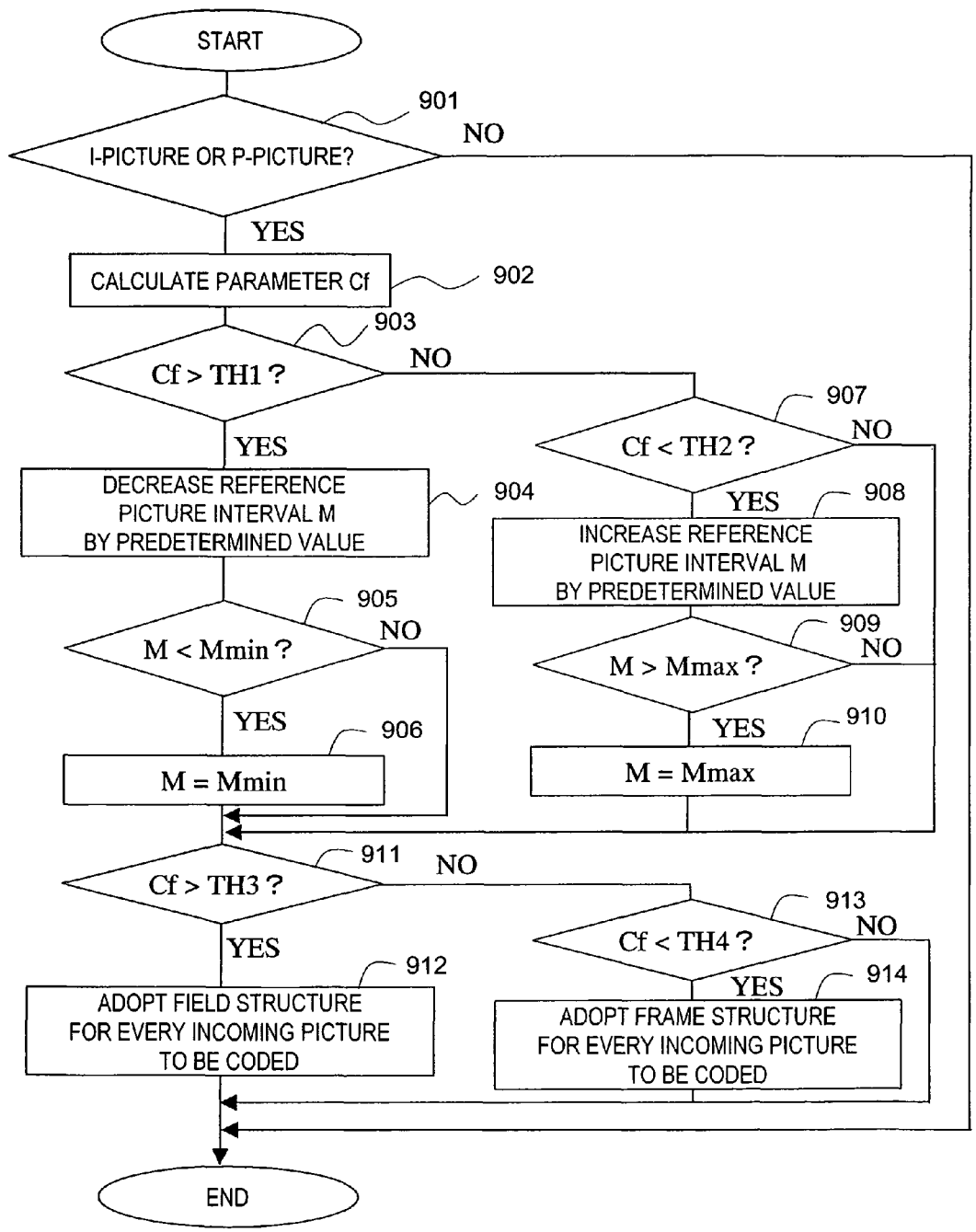
FIG. 9 is a flowchart showing the order of processing to be performed by the predicting method determining section 109 for determining a coding method on a frame picture basis and a picture structure for compression coding.

Hereinafter, these process steps 603 and 604 to be carried out by the predicting method determining section 109 will be described in further detail. FIG. 9 shows the order of processing for determining the coding method on a frame picture basis and the picture structure for compression coding. The process shown in FIG. 9 consists of processing steps 901 through 914. Among these processing steps, Steps 901 and 902 are performed by the degree-of-variation parameter calculating section 108 and are shown here just to clarify the processing flow. The predicting method determining section 109 actually carries out Step 903 and following processing steps.

In those steps 903 through 914 shown in FIG. 9, Steps 903 through 910 make up the process for determining the coding method on the frame picture basis and Steps 911 through 914 make up the process for determining the picture structure for compression coding.

First, the process consisting of Steps 903 through 910 for determining the coding method on the frame picture basis will be described. In Step 903, the predicting method determining section 109 determines whether or not the degree-of-variation parameter Cf calculated by the degree-of-variation parameter calculating section 108 is greater than a first threshold value TH1. If the answer is YES, then the predicting method determining section 109 judges that the moving picture has a quick motion and the process advances to Step 904. Otherwise, the process advances to Step 907.

In Step 904, the predicting method determining section 109 decreases the reference picture interval M shown in FIG. 2 by a predetermined value (e.g., 1), thereby narrowing the interval between I- and P-pictures or between P-pictures. In this manner, the moving picture coder 100 can increase the frequency of occurrence of frame pictures to be coded as I- or P-pictures and can cope with a moving picture with a quick motion.

However, various inconveniences should be caused if the modified reference picture interval M were too small (e.g., became zero). Thus, that M value needs to be controlled. For that reason, the predicting method determining section 109 determines in Step 905 whether or not the modified M value is smaller than a minimum value Mmin. If the answer is YES, then the process advances to Step 906. Otherwise, the process jumps to Step 911. In Step 906, the predicting method determining section 109 sets the modified M value equal to the minimum value Mmin and then the process advances to Step 911.

In Step 907, the predicting method determining section 109 compares the value of the degree-of-variation parameter Cf with a second threshold value TH2. If the degree-of-variation parameter Cf is smaller than the second threshold value TH2, then the process advances to Step 908. Otherwise, the process advances to Step 911. In Step 908, the predicting method determining section 109 increases the reference picture interval M shown in FIG. 2 by a predetermined value (e.g., 1), thereby broadening the interval between I- and P-pictures or between P-pictures. As a result, even a moving picture with a slow motion can be coded efficiently.

However, various inconveniences should be caused in terms of the capacity of the input picture memory 101 and the amount of coding processing delay if the modified reference picture interval M were too broad. Thus, that M value needs to be controlled. For that reason, the predicting method determining section 109 determines in Step 909 whether or not the modified M value is greater than a maximum value Mmax. If the answer is YES, then the process advances to Step 910. Otherwise, the process jumps to Step 911. In Step 910, the predicting method determining section 109 sets the modified M value equal to the maximum value Mmax and then the process advances to Step 911.

By performing the process described above, the predicting method determining section 109 can determine the interval between the I- and P-pictures or between the P-pictures. Consequently, particularly when the degree-of-variation parameter is large (i.e., when the temporal variation of a moving picture signal is greater than the spatial variation thereof), the predicting method determining section 109 can minimize the decrease in prediction efficiency by narrowing the reference picture interval M.

It should be noted that in Steps 901 and 902, the degree-of-variation parameter Cf is supposed to be calculated for a picture to be compression-coded as an I- or P-picture and B-pictures are not taken into consideration. This is because B-pictures are never used as reference pictures and there is no need to perform the foregoing process on the B-pictures. Still, it is possible to calculate the degree-of-variation parameter of B-pictures and determine the reference picture interval using that parameter.

Next, the process consisting of Steps 911 through 914 for determining the picture structure for compression coding will be described. As used herein, "to determine the picture structure" means to determine whether the picture unit for compression coding should be a frame picture or a field picture to make up the frame picture. The former picture structure will be referred to herein as a "frame structure" and the latter picture structure will be referred to herein as a "field structure".

First, in Step 911, the predicting method determining section 109 determines whether or not the degree-of-variation parameter. Cf calculated in Step 902 is greater than a third threshold value TH3. If the answer is YES, then the process advances to Step 912. Otherwise, the process advances to Step 913. In Step 912, the predicting method determining section 109 makes the settings such that every picture to be coded after the frame picture, for which the degree-of-variation parameter has been calculated, should have a field structure as its picture structure. This is because the moving picture appears to such have a violent motion that the decrease in prediction efficiency needs to be minimized. When a moving picture has a quick motion, prediction can be done accurately and the quality of the compression-coded moving picture can be kept high by performing compression coding on a field picture basis. Thereafter, the process ends.

On the other hand, in Step 913, the degree-of-variation parameter Cf is compared with a fourth threshold value TH4. If the degree-of-variation parameter Cf is smaller than the fourth threshold value TH4, then the process advances to Step 914. Otherwise, the process ends. In Step 914, the predicting method determining section 109 makes the settings such that every picture to be coded after that should have a frame structure as its picture structure. Thereafter, the process ends.

By performing these operations, particularly when the degree-of-variation parameter is large (i.e., if the temporal variation of the moving picture data is greater than the spatial variation thereof), the decrease in prediction efficiency can be minimized by adopting the field structure for the I-picture or P-picture. A B-picture may be coded by the same picture structure as that of the previously coded I- or P-picture. Alternatively, the picture structure of a B-picture may be directly determined by using the degree-of-variation parameter Cf. As another alternative, the picture structure may also be fixed.

As for the process shown in FIG. 9, the degree-of-variation parameter of an I- or P-picture as a candidate picture is supposed to be calculated and the picture structure of that picture is supposed to be switched into a frame structure or a field structure. Alternatively, either an I-picture or a P-picture alone may have its picture structure switched.

The processes associated with Steps 603 and 604 shown in FIG. 6 have been described in detail with reference to FIG. 9.

Figure 10:
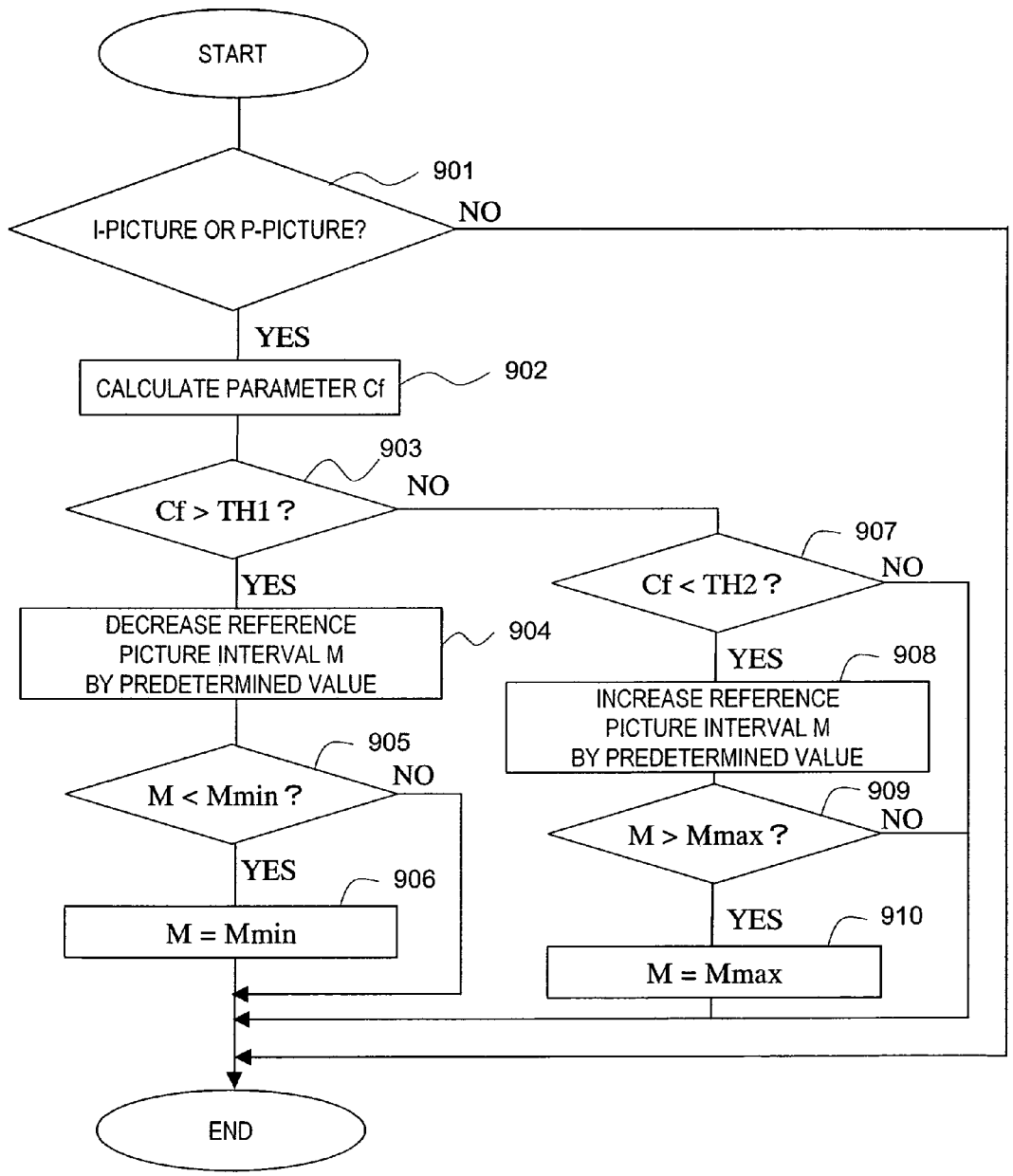
FIG. 10 is a flowchart showing the order of processing for determining a coding method on a frame picture basis.
Figure 11:
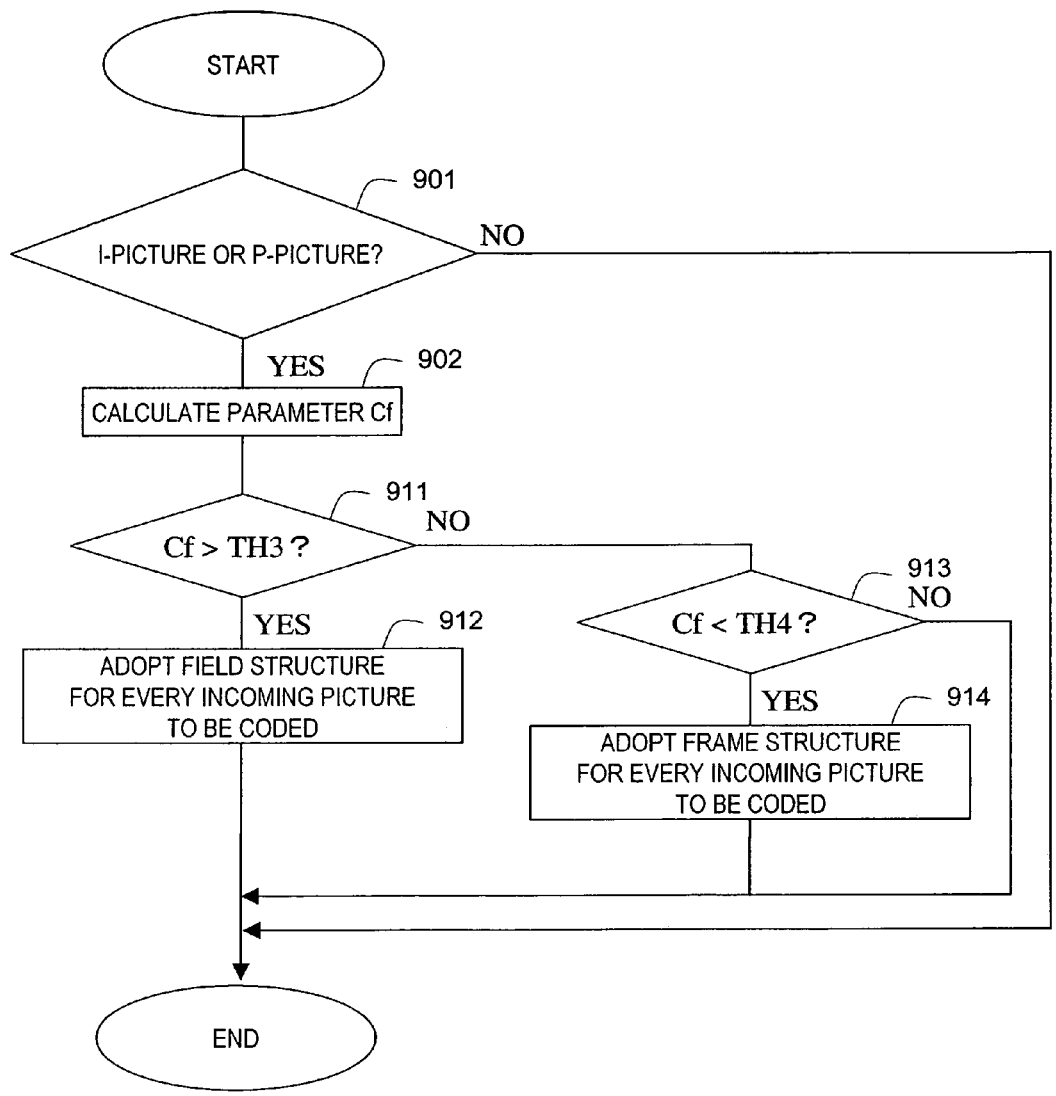
FIG. 11 is a flowchart showing the order of processing for determining a picture structure for compression coding.

Steps 901 through 914 shown in FIG. 9 are a processing procedure to allow the predicting method determining section 109 to carry out Steps 603 and 604 continuously. Optionally, the predicting method determining section 109 may selectively carry out only the processing steps associated with Step 603 or those associated with Step 604. FIG. 10 shows the order of processing, associated with Step 603, for determining a coding method on a frame picture basis. FIG. 11 shows the order of processing, associated with Step 604, for determining a picture structure for compression coding. In FIGS. 10 and 11, each step identical with the counterpart shown in FIG. 9 is identified by the same reference numeral. As can be seen from these drawings, all of these steps are already shown in FIG. 9 and the description thereof will be omitted herein.

Next, in Step 605 shown in FIG. 6, in accordance with the coding method and picture structure that have been determined by the predicting method determining section 109, the processing section compression-codes the moving picture data stored in the memory, thereby generating compression-coded data. For example, if the picture structure selected is a frame structure and if the respective frame pictures are compression-coded as I-, B- and P-pictures as shown in the upper part of FIG. 3(*c*) (i.e., in the order of input), then the coding order control section 110 determines that the pictures should be coded in the order shown in the lower part of FIG. 3(*c*) (i.e., in the order of coding). Then, the motion vector estimating section 103 and DCT/quantizing section 105 read and process the picture data representing the frame pictures in that order. Thereafter, the picture data is further processed by other components, thereby generating compressed data including I-, B- and P-pictures.

Finally, in Step 606 shown in FIG. 6, the processing steps 602 through 605 are repeatedly carried out until every moving picture data is compression-coded. In this manner, compressed data is generated from the moving picture data.

FIGS. 12(*a*) and 12(*b*) show the data structures of picture data included in the compressed data generated. Specifically, FIG. 12(*a*) shows the data structure of the picture data that has been compression-coded by the frame structure. As can be seen from FIG. 12(*a*), the picture data is located next to a picture header, which includes a picture type field and a picture structure field as its main fields. In the picture type field, the picture type of the picture data, i.e., an I-picture, a B-picture or a P-picture, is described. In the picture structure field on the other hand, information indicating whether the picture of the picture data has the frame structure or the field structure is described. In FIG. 12(*a*), information indicating that the picture has the frame structure is described in the picture structure field. The picture data includes data representing a first field picture and data representing a second field picture as a mixture. These two fields will be separated from each other when the compression-coded picture data is read.

On the other hand, FIG. 12(*b*) shows the data structure of picture data (i.e., a frame picture) that has been compression-coded by the field structure. This data structure includes a first-field picture header, first-field picture data, a second-field picture header, and second-field picture data in this order. The first field picture can be obtained based on the first-field picture header and first-field picture data, while the second field picture can be obtained based on the second-field picture header and second-field picture data. The data structure of each of these picture headers includes a picture type field and a picture structure field as in the frame structure described above. In this case, however, the picture type is specified field by field. Accordingly, in an I-frame, for example, a picture type indicating that the first field is an I-field is described in the first-field picture header and a picture type indicating that the second field is an I-field or a P-field is described in the second-field picture header. In each of the picture structure fields, information indicating the identity of its associated field is described.

Figure 13:
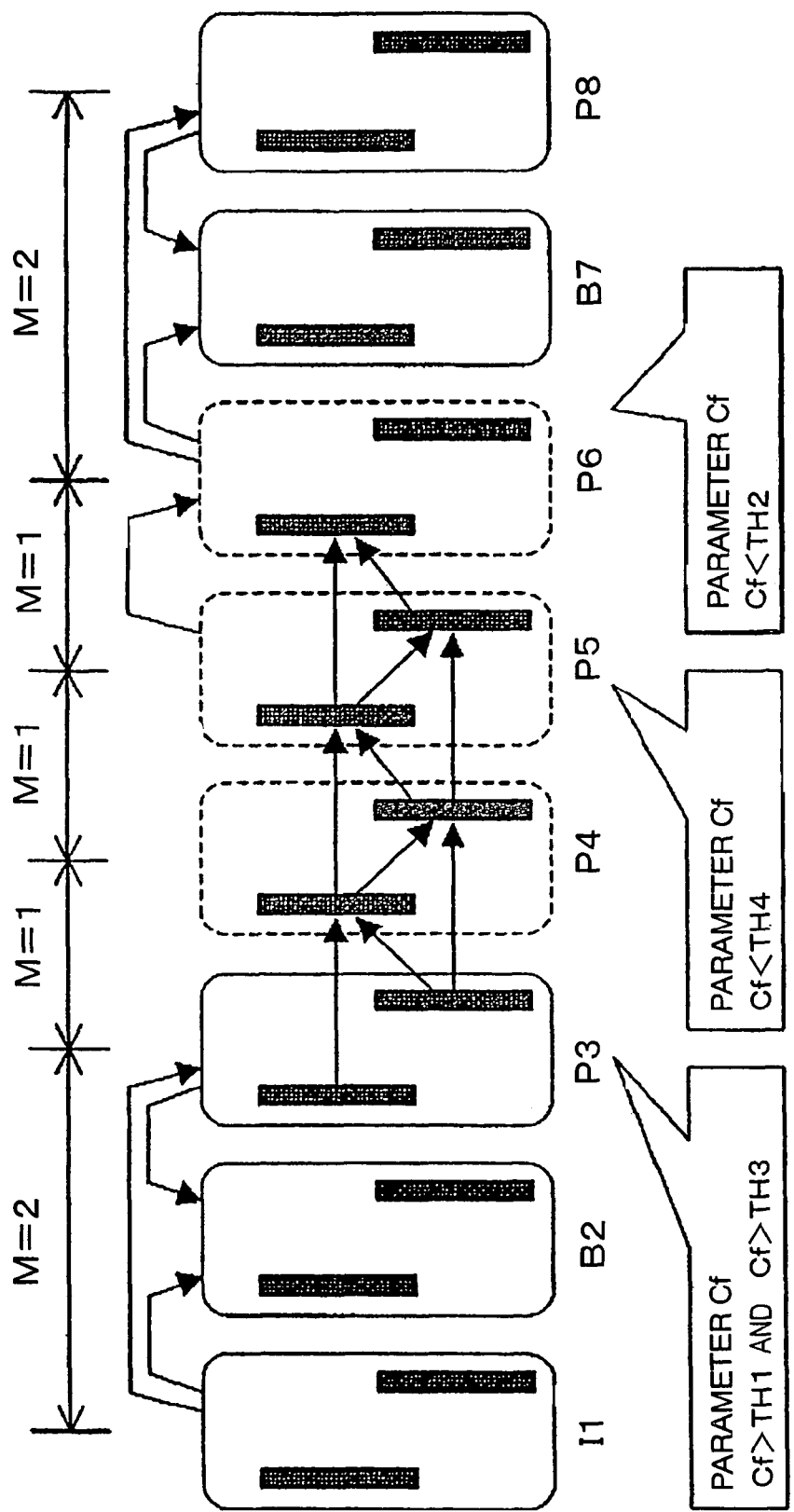
FIG. 13 shows relationships between the degree-of-variation parameter and the picture structure of compressed data.

FIG. 13 shows relationships between the degree-of-variation parameter and the picture structure of compressed data. In FIG. 13, I, B and P denote an I-picture, a B-picture and a P-picture, respectively. The numeral attached to I, B or P indicates the frame number as counted from the first I picture. The picture structure of each picture encircled with the solid line (i.e., I1, B2, P3 and so on) is supposed to be frame structure, while the picture structure of each picture encircled with the dashed line (i.e., P4, P5 and P6) is supposed to be field structure.

In FIG. 13, each of the first three pictures I1, B2 and P3 is coded with M=2 and by the frame structure. In this case, these pictures are coded in the order of I1, P3 and B2.

However, the picture structure of the following picture P4 is changed into field structure. This is because the degree-of-variation parameter Cf, calculated for the picture P3, satisfies Cf>TH1 and Cf>TH3. As a result, the reference picture interval M is changed from M=2 into M=1 (see Step 904 shown in FIG. 9) and the picture structure is also changed into field structure (see Step 912). Consequently, the reference picture interval becomes one field and good prediction efficiency can be maintained even with respect to a picture with a quick motion.

Next, while pictures P4 and P5 are being coded on a field-by-field basis, the degree-of-variation parameter Cf, calculated for the picture P5, satisfies Cf<TH4 and therefore, the picture structure is changed from field structure into frame structure (see Step 914). Thereafter, since the degree-of-variation parameter Cf, calculated for the next picture P6, satisfies Cf<TH2, the reference picture interval M is changed from M=1 into M=2 (see Step 907).

According to the results of the processing described above, if a P-picture satisfies M=1, its picture structure may be field structure. On the other hand, if the P-picture satisfies M≧2, its picture structure may be frame structure. However, this is just an example. Alternatively, when M=1, the first field of an I-picture may be an I-field and the second field thereof may be a P-field, for example. As another alternative, no matter whether M=1 or M≧2 (i.e., whatever the M value may be), the picture structure of a P-picture may always be a frame structure. Also, the picture structure of an I-picture or a P-picture may be the same as that of the previous I- or P-picture. Furthermore, the picture structure of a B-picture may be the same as that of its reference I- or P-picture.

As for the threshold values TH1 through TH4 described above, a simpler control is realized by setting TH1=TH3 and TH2=TH4. In the example shown in FIG. 13, it is only necessary to switch a first state in which M=2 and frame structure is adopted into a second state in which M=1 and field structure is adopted, or vice versa, thus simplifying the processing.

In the example described above, M=2 is switched into M=1 and vice versa. Alternatively, the two M values to be switched may have a difference of 2 or more (e.g., M=3 may be switched into M=1 and vice versa). As another alternative, three or more M values (e.g., M=3, M=2 and M=1) may be switched one after another.

Figure 14:
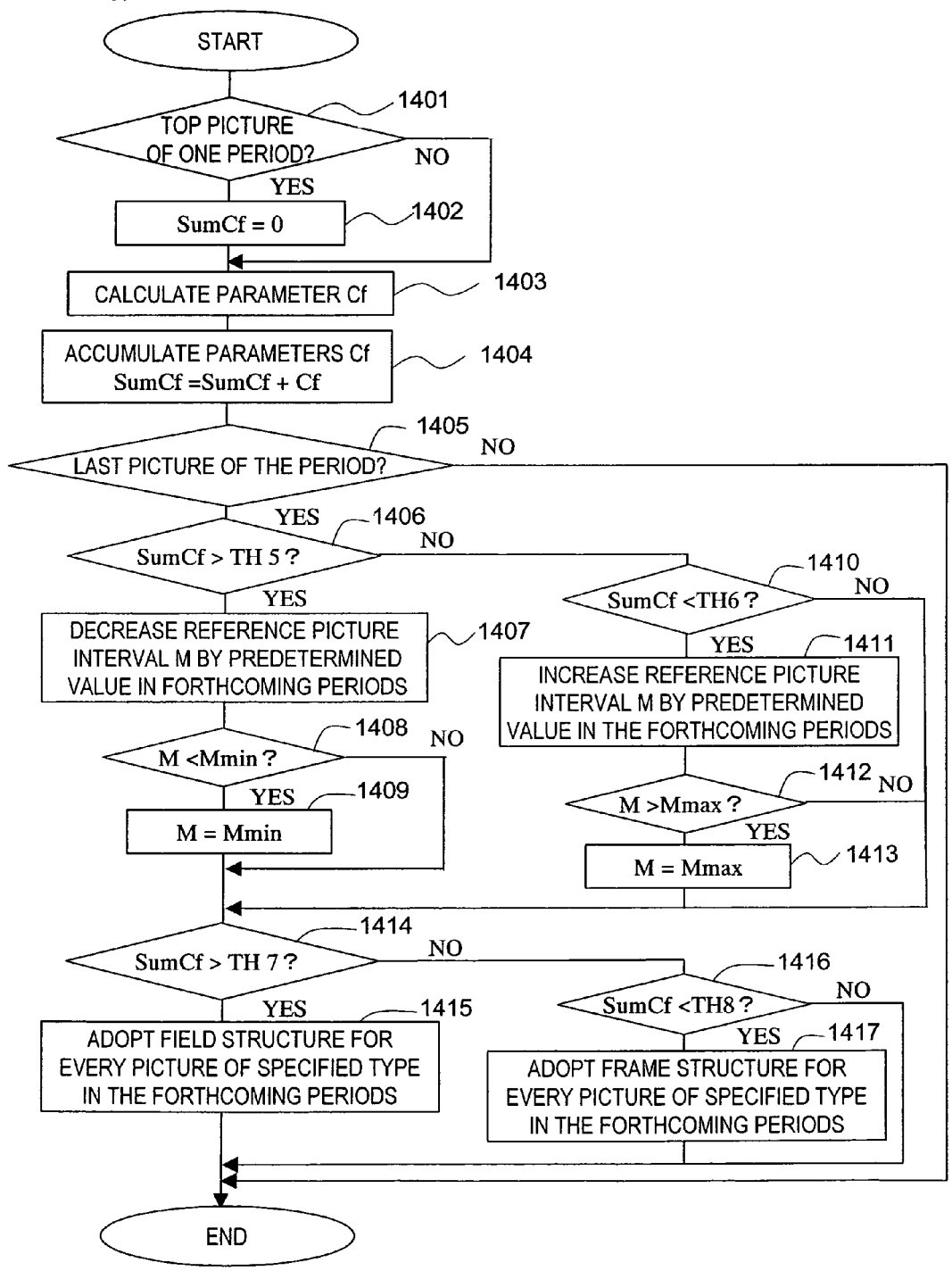
FIG. 14 is a flowchart showing the order of processing for determining a frame picture coding method according to a predetermined period and a picture structure for compression coding.

Next, another processing to be carried out by the predicting method determining section 109 for determining the coding method and picture structure of each picture will be described with reference to FIG. 14. FIG. 14 shows the order of processing for determining a frame picture coding method according to a predetermined period and a picture structure for compression coding. As used herein, the "predetermined period" is a period between an I-picture and the next I-picture (i.e., the interval N shown in FIG. 2), the period of P-pictures (i.e., the interval M shown in FIG. 2) and a period that is longer than any of these periods an integral number of times.

As in the example described above, the "I-picture" and "P-picture" refer to a candidate picture to be compression-coded as an I-picture and a candidate picture to be compression-coded as a P-picture, respectively. Among multiple pictures included between an I-picture and the next I-picture, a group consisting of the top I-picture and following P and B pictures is called a "group of pictures (GOP)". A GOP has a length corresponding to a moving picture playback time of about 0.5 seconds. In the following description, the "period" is supposed to be a period from an I-picture to the next I-picture (i.e., a GOP period).

First, in Step 1401, the degree-of-variation parameter calculating section 108 determines whether or not the picture to be coded is the candidate picture at the top of a GOP (which will be referred to herein as a "top picture"). If the answer is YES, the process advances to Step 1402. Otherwise, the process jumps to Step 1403. In Step 1402, the degree-of-variation parameter calculating section 108 resets the value of a parameter SumCf to zero and the process advances to the next step 1403. The parameter SumCf is used to hold the sum of the degree-of-variation parameters Cf.

The degree-of-variation parameter calculating section 108 calculates the degree-of-variation parameter Cf of the picture in Step 1403 and then adds it to the value of the parameter SumCf in the next step 1404, thereby updating the parameter SumCf depending on the result. In the next step 1405, the degree-of-variation parameter calculating section 108 determines whether or not the picture being processed is the candidate picture at the end of one GOP period (which will be referred to herein as a "last candidate picture"). If the answer is YES, the process advances to Step 1406. Otherwise, the processing shown in FIG. 14 is ended and the picture is compression-coded without changing the current coding conditions at all. Thereafter, the processing starting from Step 1401 will be carried out all over again on the next picture.

In Step 1406, the predicting method determining section 109 determines the coding condition in the following manner. Specifically, in Step 1406, the predicting method determining section 109 determines whether or not the value of the parameter SumCf is greater than a fifth threshold value TH5. If the answer is YES, the process advances to Step 1407. Otherwise, the process advances to Step 1410.

In Step 1407, the predicting method determining section 109 decreases the interval M of the reference pictures (i.e., I-pictures or P-pictures), included in the next and following periods, by a predetermined value (e.g., 1). This means that the coding condition is adjusted for the pictures of the next period according to the tendency of the pictures included in the current period.

Next, in Step 1408, the predicting method determining section 109 determines whether or not the modified M value is smaller than the minimum value Mmin. If the answer is YES, then the process advances to Step 1409. Otherwise, the process jumps to Step 1414. In Step 1409, the predicting method determining section 109 sets the modified M value equal to the minimum value Mmin and then the process advances to Step 1414. These steps 1408 and 1409 are provided for the same reason as Steps 905 and 906 shown in FIG. 9.

In Step 1410, the predicting method determining section 109 compares the value of the parameter SumCf with a sixth threshold value TH6. If the value of the parameter SumCf is smaller than the threshold value TH6, the process advances to Step 1411. Otherwise, the process advances to Step 1414.

In Step 1411, the predicting method determining section 109 increases the interval M of the reference pictures, included in the next and following periods, by a predetermined value (e.g., 1). That is to say, as already described for Step 1407, the coding condition is adjusted for the pictures of the next period according to the tendency of the pictures included in the current period.

Next, in Step 1412, the predicting method determining section 109 determines whether or not the modified M value is greater than the maximum value Mmax. If the answer is YES, then the process advances to Step 1413. Otherwise, the process jumps to Step 1414. In Step 1413, the predicting method determining section 109 sets the modified M value equal to the maximum value Mmax and then the process advances to Step 1414.

Steps 1414 through 1417 make up a process for determining the picture structure, which is one of the coding conditions for the pictures of the next period. First, in Step 1414, the predicting method determining section 109 compares the value of the parameter SumCf with a seventh threshold value. If the value of the parameter SumCf is greater than the threshold value TH7, the process advances to Step 1415. Otherwise, the process advances to Step 1416.

In Step 1415, the settings are made such that every picture, which is included in the next or following period and which has the specified picture type, be coded by the field structure. The reason is as follows. Specifically, since the value of the parameter SumCf is greater than the threshold value TH7, each picture appears to such have a violent motion that the decrease in prediction efficiency needs to be minimized for the next period.

On the other hand, in Step 1416, the value of the parameter SumCf is compared with an eighth threshold value TH8. If the degree-of-variation parameter Cf is smaller than the eighth threshold value TH8, then the process advances to Step 1417. Otherwise, the process ends. In Step 1417, the predicting method determining section 109 makes the settings such that every picture, which is included in the next or following period and which has the specified picture type, be coded by the frame structure. Thereafter, the process ends.

By performing these operations, particularly when the degree-of-variation parameter is large (i.e., if the temporal variation of the moving picture data is greater than the spatial variation thereof), the decrease in prediction efficiency can be minimized by narrowing the reference picture interval M and by adopting the field structure for the I-picture or P-picture.

Next, it will be described how to handle the compressed data generated. FIG. 15(a) shows an arrangement of functional blocks for an encoding system 10. The encoding system 10 includes the coder 100, a transmitting section 150 and a writing section 151. The encoding system 10 may be installed as broadcasting equipment at a broadcasting station. In that case, an edited moving picture is transformed by the moving picture coder 100 into compressed data, which is transmitted by the transmitting section 150 to user's home by way of a transport medium such as radio wave or a transmission line. Alternatively, the compressed data, which has been output from the moving picture coder 100, is written by the writing section 151 on a storage medium 200. Examples of preferred storage media 200 include optical storage media such as optical discs, semiconductor storage media such as an SD memory card, and magnetic recording media such as a hard disk. If the picture quality may be almost equal to the conventional one, then the frequency band and transmission time required for transmission can be cut down or the required storage capacity of the storage medium 200 can be reduced because the compressed data has a smaller amount of data.

Alternatively, the encoding system 10 is also implementable with a general purpose PC. In that case, the moving picture coder 100 may be an encoder board, which is built in a PC, for example. If the incoming moving picture signal is a TV signal, then the PC 10 stores compressed data about a TV program on a hard disk 200 within a hard disk drive 151.

On the other hand, FIG. 15(b) shows an arrangement of functional blocks for a decoding system 11. The decoding system 11 includes a receiving section 160, a reading section 161, a decoder 300 and a display section 170. The decoding system 11 may be installed as an audiovisual system at a TV viewer's home. In that case, the receiving section 160 may be either an antenna to receive radio wave carrying compressed data or a set top box receiving port to receive a broadcast signal carrying compressed data. The reading section 161 may be a drive or a memory card slot (not shown) for reading out compressed data from the storage medium 200. The decoder 300 has the function of decoding the compressed data. For example, if the compressed data is generated in compliance with an MPEG standard, then the decoder 300 is preferably an MPEG decoder that can analyze the data structure shown in FIG. 12 and can decode the compressed data based on the result of analysis. However, this decoding function is not one of the principal features of the present invention and further description of the decoder 300 will be omitted herein. The display section 170 may be a TV set with a loudspeaker. The viewer can either receive the compressed data at the decoding system 11 or read it out from the storage medium 200 and decode it so as to view the moving picture.

Preferred configuration and operation of the moving picture coder 100 are as described above. The moving picture coder 100 of the present invention controls dynamically the interval between an I-picture and a P-picture and/or the interval between P-pictures according to the degree-of-variation parameter representing how much the moving picture has changed. In addition, the moving picture coder 100 also dynamically switches the picture structure from the frame structure into field structure, or vice versa, thereby increasing the coding efficiency as well. Accordingly, compared with compressed data generated by a conventional coder, the compressed data generated by the moving picture coder 100 ensures a higher playback picture quality if the amounts of data included are almost the same or can cut down the amount of data included if the picture qualities are almost the same. Thus, according to the present invention, compression coding is realized with sufficient quality maintained and with much more efficiency.

It should be noted that specific values of the threshold values TH1 through TH8 mentioned above may be determined arbitrarily by the manufacturer of the moving picture coder 100 in accordance with its specifications. Alternatively, any threshold values TH1 through TH8 may also be selected according to the required quality of the compressed data.

In the preferred embodiments described above, the moving picture to be processed by the picture coder 100 is supposed to be an interlaced picture. Optionally, the present invention is also applicable to a progressive picture. In the progressive picture, however, there are no field pictures but only frame pictures are included. Accordingly, two consecutive frame pictures to be presented every 1/60 second may be used as the first and second fields described above. In that case, $F(x, y)$ of Equation (1) and so on may be replaced with the pixel value $G_1(x, y)$ of the first frame picture and $F(x, y+1)$ thereof may be replaced with the pixel value $G_2(x, y)$ of the second frame picture. Also, in Equation (2) and so on, $F(x, y)$ may be replaced with the pixel value $G_2(x, y)$ of the first frame picture and $F(x, y+2)$ thereof may be replaced with the pixel value $G_1(x, y+1)$ of the first frame picture. Then, the temporal and spatial variations can be obtained by performing quite the same processing as that already described for the interlacing method.

The data processor 100 performs the processing described above based on a computer program. For example, the process for generating the compressed data is carried out by executing a computer program that is described based on the flowcharts shown in FIGS. 6, 9 and 14. The computer program may be stored in any of various types of storage media. Examples of preferred storage media include optical storage media such as optical discs, semiconductor storage media such as an SD memory card and an EEPROM, and magnetic recording media such as a flexible disk. Alternatively, the computer program may also be downloaded via a telecommunications line (e.g., through the Internet, for example) and installed in the optical disc drive 100.

INDUSTRIAL APPLICABILITY

The present invention provides a data processor and a data processing method for compression-coding moving picture data more efficiently while maintaining good quality. The present invention is effectively applicable for use in the fields of data processing including writing, transferring and reading compression-coded data.

The invention claimed is:

1. A data processor for compression-coding moving picture data, representing a moving picture, on the basis of a predetermined picture unit by an intra-picture coding method, a forward predictive coding method or a bidirectional predictive coding method, the moving picture being obtained by presenting a plurality of frame pictures, each consisting of two field pictures, one after another, the data processor comprising:
a memory for storing the moving picture data;
a calculating section for calculating a parameter, representing a magnitude on how much the moving picture has changed, based on the moving picture data of the two field pictures;
a determining section for determining, by the parameter that has been calculated by the calculating section, an interval M of picture units, for which the moving picture data is going to be compression-coded by the intra-picture coding method and the forward predictive coding method and adopting a picture structure defining the predetermined picture unit; and
a processing section for compression-coding the moving picture data, stored in the memory, according to the interval M and the picture structure that have been determined and adopted by the determining section, thereby generating compressed data, wherein
if the parameter is equal to or greater than a predetermined threshold value, the determining section determines that the value of the interval M is 1 and that the picture unit is a field picture, and
if the parameter is smaller than a predetermined threshold value, the determining section determines that the interval M is equal to or greater than 2 and that the picture unit is a frame picture.

2. The data processor of claim 1, wherein if the value of the interval M is 1, the determining section adopts a field structure as the picture structure for the pictures compression-coded by the intra-picture coding method and the forward predictive coding method, and adopts a frame structure as the picture structure for the pictures compression-coded by the bidirectional predictive coding method.

3. The data processor of claim 1, wherein if the value of the interval M is 1, the determining section adopts a field structure as the picture structure for the pictures compression-coded by the intra-picture coding method,
wherein the determining section determines that the moving picture data of a first field is compression-coded by the intra-picture coding method and that the moving picture data of a second field by the forward predictive coding method.

4. A data processing system comprising:
a data processor for compression-coding moving picture data, representing a moving picture, on the basis of a predetermined picture unit by an intra-picture coding method, a forward predictive coding method or a bidirectional predictive coding method, the moving picture being obtained by presenting a plurality of frame pictures, each consisting of two field pictures, one after another, and
a transmitting section,
wherein the data processor includes:
a memory for storing the moving picture data;
a calculating section for calculating a parameter, representing a magnitude on how much the moving picture has changed, based on the moving picture data of the two field pictures;
a determining section for determining, by the parameter that has been calculated by the calculating section, an interval M of picture units, for which the moving picture data is going to be compression-coded by the intra-picture coding method and the forward predictive coding method and adopting a picture structure defining the predetermined picture unit; and
a processing section for compression-coding the moving picture data, stored in the memory, according to the interval M and the picture structure that have been determined and adopted by the determining section, thereby generating compressed data,
wherein:
if the parameter is equal to or greater than a predetermined threshold value, the determining section determines that the value of the interval M is 1 and that the picture unit is a field picture,
if the parameter is smaller than a predetermined threshold value, the determining section determines that the interval M is equal to or greater than 2 and that the picture unit is a frame picture, and
the transmitting section transmits the compressed data, which has been generated by the processing section of the data processor, through a transport medium.

5. A data processing system comprising:
a data processor for compression-coding moving picture data, representing a moving picture, on the basis of a predetermined picture unit by an intra-picture coding method, a forward predictive coding method or a bidirectional predictive coding method, the moving picture being obtained by presenting a plurality of frame pictures, each consisting of two field pictures, one after another, and
a writing section,
wherein the data processor includes:
a memory for storing the moving picture data;
a calculating section for calculating a parameter, representing a magnitude on how much the moving picture has changed, based on the moving picture data of the two field pictures;
a determining section for determining, by the parameter that has been calculated by the calculating section, an interval M of picture units, for which the moving picture data is going to be compression-coded by the intra-picture coding method and the forward predictive coding method and adopting a picture structure defining the predetermined picture unit; and
a processing section for compression-coding the moving picture data, stored in the memory, according to the interval M and the picture structure that have been determined and adopted by the determining section, thereby generating compressed data,
wherein:
if the parameter is equal to or greater than a predetermined threshold value, the determining section determines that the value of the interval M is 1 and that the picture unit is a field picture,
if the parameter is smaller than a predetermined threshold value, the determining section determines that the interval M is equal to or greater than 2 and that the picture unit is a frame picture, and
the writing section writes the compressed data, which has been generated by the processing section of the data processor, onto a storage medium.

6. A data processing method for compression-coding moving picture data, representing a moving picture, on the basis of a predetermined picture unit by an intra-picture coding method, a forward predictive coding method or a bidirectional predictive coding method, the moving picture being obtained by presenting a plurality of frame pictures, each consisting of two field pictures, one after another, the method comprising the steps of:
storing the moving picture data;
calculating a parameter, representing a magnitude on how much the moving picture has changed, based on the moving picture data of the two field pictures;
determining, by the parameter calculated, an interval M of picture units, for which the moving picture data is going to be compression-coded by the intra-picture coding method and the forward predictive coding method and adopting a picture structure defining the predetermined picture unit; and
compression-coding the moving picture data according to the interval M and the picture structure that have been determined and adopted, thereby generating compressed data,
wherein:
if the parameter is equal to or greater than a predetermined threshold value, the determining section determines that the value of the interval M is 1 and that the picture unit is a field picture, and
if the parameter is smaller than a predetermined threshold value, the determining section determines that the interval M is equal to or greater than 2 and that the picture unit is a frame picture.

* * * * *